(12) United States Patent
Tsuchizawa et al.

(10) Patent No.: US 10,562,533 B2
(45) Date of Patent: Feb. 18, 2020

(54) BICYCLE CONTROLLER AND BICYCLE CONTROL SYSTEM INCLUDING BICYCLE CONTROLLER

(71) Applicant: Shimano Inc., Sakai, Osaka (JP)

(72) Inventors: Yasuhiro Tsuchizawa, Osaka (JP); Hiroshi Matsuda, Osaka (JP); Hiroyuki Miyoshi, Osaka (JP); Takuya Katsuki, Osaka (JP)

(73) Assignee: Shimano Inc., Osaka (JP)

( * ) Notice: Subject to any disclaimer, the term of this patent is extended or adjusted under 35 U.S.C. 154(b) by 156 days.

(21) Appl. No.: 15/794,366

(22) Filed: Oct. 26, 2017

(65) Prior Publication Data
US 2018/0118211 A1    May 3, 2018

(30) Foreign Application Priority Data
Oct. 31, 2016   (JP) .................. 2016-213623

(51) Int. Cl.
*B62M 25/08* (2006.01)
*B62M 6/45* (2010.01)
(Continued)

(52) U.S. Cl.
CPC .......... *B60W 30/188* (2013.01); *B60W 10/08* (2013.01); *B60W 10/11* (2013.01);
(Continued)

(58) Field of Classification Search
CPC . B62M 25/08; B62M 6/45; F16H 2061/0444; F16H 2061/0448
See application file for complete search history.

(56) References Cited

U.S. PATENT DOCUMENTS 5,599,244 A * 2/1997 Ethington .............. B62M 9/122
280/261
8,831,810 B2 * 9/2014 Shoge ...................... B62M 6/45
701/22
(Continued)

FOREIGN PATENT DOCUMENTS

CN      105799851 A   7/2016
JP      2001-010581 A  1/2001
(Continued)

*Primary Examiner* — Tisha D Lewis
(74) *Attorney, Agent, or Firm* — Global IP Counselors, LLP

(57) ABSTRACT

A bicycle controller includes an electronic control unit that controls a transmission unit and a motor in accordance with a shift request that changes the transmission ratio. If the transmission ratio is changed in multiple steps in accordance with the shift request, then the electronic control unit selectively executes one of first and second shifting operations. In the first shifting operation, the output of the motor is limited and the transmission unit is operated to reach a requested transmission ratio that corresponds to the shift request. In the second shifting operation, the output of the motor is limited and the transmission unit is operated to reach an intermediate transmission ratio of the requested transmission ratio, and after the electronic control unit temporarily reduces the limitation on the output of the motor, the electronic control unit again limits the output of the motor and operates the transmission unit.

21 Claims, 8 Drawing Sheets

(51) Int. Cl.
*F16H 61/04* (2006.01)
*B60W 30/188* (2012.01)
*B60W 10/08* (2006.01)
*B60W 10/11* (2012.01)

(52) U.S. Cl.
CPC .............. *B62M 6/45* (2013.01); *B62M 25/08* (2013.01); *B60W 2300/36* (2013.01); *B60W 2510/1005* (2013.01)

(56) References Cited

U.S. PATENT DOCUMENTS

| | | | |
|---|---|---|---|
| 9,114,850 B2 * | 8/2015 | Tanaka | B62M 6/45 |
| 2009/0005215 A1 * | 1/2009 | Silveri | B60W 20/30 |
| | | | 477/5 |
| 2013/0030629 A1 * | 1/2013 | Suzuki | B62M 6/45 |
| | | | 701/22 |

FOREIGN PATENT DOCUMENTS

| | | |
|---|---|---|
| JP | 2004-268854 A | 9/2004 |
| JP | 5496158 B2 | 5/2014 |
| JP | 5685635 B2 | 3/2015 |

* cited by examiner

BICYCLE CONTROLLER AND BICYCLE CONTROL SYSTEM INCLUDING BICYCLE CONTROLLER

This application claims priority to Japanese Patent Application No. 2016-213623, filed on Oct. 31, 2016. The entire disclosure of Japanese Patent Application No. 2016-213623 is hereby incorporated herein by reference.

CROSS-REFERENCE TO RELATED APPLICATIONS

Background

Field of the Invention

The present invention generally relates to a bicycle controller and a bicycle control system that includes a bicycle controller.

Background Information

Some bicycles are provided with a bicycle controller to control shifting of a transmission. For example, Japanese Patent No. 5,496,158 discloses a bicycle controller that controls a transmission unit in accordance with a shift request that changes the transmission ratio of a bicycle.

SUMMARY

The above bicycle controller disclosed in Japanese Patent No. 5,496,158 executes a predetermined control regardless of the content of the shift request that changes the transmission ratio. Thus, it is desirable that a bicycle controller be configured to control the transmission unit in accordance with the content that changes the transmission ratio.

One object of the present invention is to provide a bicycle controller and a bicycle control system that are configured to control a transmission unit in accordance with the content of a shift request that changes the transmission ratio.

In a first aspect of the invention, a bicycle controller includes an electronic control unit that controls a transmission unit, which is configured to change transmission ratio of a bicycle in a stepped manner, and that controls a motor, which assists propulsion of the bicycle, in accordance with a shift request that changes the transmission ratio. The electronic control unit is configured to selectively execute one of a first shifting operation and a second shifting operation in a case in which the transmission ratio is changed in multiple steps in accordance with the shift request. In the first shifting operation, the electronic control unit limits output of the motor and operates the transmission unit to reach a requested transmission ratio that corresponds to the shift request. In the second shifting operation, the electronic control unit is configured to limit the output of the motor and operate the transmission unit to reach an intermediate transmission ratio of the requested transmission ratio, and after the electronic control unit temporarily reduces the limitation on the output of the motor, the electronic control unit again limits the output of the motor and operates the transmission unit. With the bicycle controller according to the first aspect, the electronic control unit controls the transmission unit in accordance with the content of the shift request that changes the transmission ratio. The electronic control unit limits the output of the motor in any one of a case that executes the first shifting operation and a case that executes the second shifting operation. This improves the transmission performance.

In a second aspect of the invention, the bicycle controller according to the first aspect is configured so that the electronic control unit is further configured to limit the output of the motor and starts to operate the transmission unit upon the electronic control unit receives the shift request, and a rotational angle of a crank of the bicycle reaching a first prescribed angle. With the bicycle controller according to the second aspect, the electronic control unit starts to operate the transmission unit at a rotational angle of the crank that is suitable for starting the operation of the transmission unit.

In a third aspect of the invention, the bicycle controller according to any one of the preceding aspects is configured so that the first prescribed angle is included in a range of 45 degrees from a first rotational angle corresponding to one of a top dead center and a bottom dead center of one of crank arms of the crank to an upstream side of the first rotational angle in a first direction in which the crank is rotated to propel the bicycle. With the bicycle controller according to the third aspect, the electronic control unit starts to operate the transmission unit in a range of the rotational angle that is the most suitable for starting the operation of the transmission unit.

In a fourth aspect of the invention, the bicycle controller according to any one of the preceding aspects is configured so that in the second shifting operation, after the electronic control unit temporarily reduces the limit on the output of the motor, the electronic control unit is further configured to limit the output of the motor and start to operate the transmission unit upon detecting a rotational angle of a crank of the bicycle reaching a second prescribed angle. With the bicycle controller according to the fourth aspect, in the second shifting operation, decreases in the output of the motor are limited during a period that is unsuitable for operating the transmission unit, that is, from the time that the limitation on the output of the motor is reduced to the time that the rotational angle of the crank reaches the second prescribed angle. The operation of the transmission unit is resumed at a rotational angle of the crank that is suitable for starting the operation of the transmission unit.

In a fifth aspect of the invention, the bicycle controller according to any one of the preceding aspects is configured so that the second prescribed angle is included in a range of 45 degrees from a second rotational angle corresponding to the other one of a top dead center and a bottom dead center of one of crank arms of the crank to an upstream side of the second rotational angle in a first direction. With the bicycle controller according to the fifth aspect, in the second shifting operation, decreases in the output of the motor are limited during a period that is unsuitable for operating the transmission unit, that is, from the time that the limitation on the output of the motor is reduced to the time that the rotational angle of the crank reaches the second prescribed angle. The operation of the transmission unit is resumed at a rotational angle of the crank that is the most suitable for starting the operation of the transmission unit.

In a sixth aspect of the invention, the bicycle controller according to any one of the preceding aspects is configured so that in the second shifting operation, after the electronic control unit temporarily reduces the limitation on the output of the motor, the electronic control unit is further configured to limit the output of the motor and starts to operate the transmission unit upon detecting the rotational angle of the crank of the bicycle reaching a second prescribed angle. The second prescribed angle is equal to the first prescribed angle. With the bicycle controller according to the sixth aspect, the first prescribed angle is set to the second prescribed angle. Thus, if the crank is rotated by 180° and/or 360° from the position of the crank located at the time that the output of the motor was first limited to start to operate the transmission unit, the output of the motor is again limited to resume the operation of the transmission unit.

In a seventh aspect of the invention, the bicycle controller according to any one of the preceding aspects is configured so that the electronic control unit is further configured to selectively execute one of the first shifting operation and the second shifting operation in accordance with the shift request that is received before the rotational angle of the crank reaches the first prescribed angle. With the bicycle controller according to the seventh aspect, the electronic control unit executes the appropriate one of the first shifting operation and the second shifting operation.

In an eighth aspect of the invention, the bicycle controller according to any one of the preceding aspects is configured so that the electronic control unit is further configured to limit the output of the motor until a first time elapses from a time that the rotational angle of the crank reaches the first prescribed angle. With the bicycle controller according to the eighth aspect, the limitation on the output of the motor is controlled based on the time. This simplifies the controls performed by the electronic control unit and reduces situations in which the assist power is reduced for a long period of time during the transmission.

In a ninth aspect of the invention, the bicycle controller according to any one of the preceding aspects is configured so that the electronic control unit is further configured to limit the output of the motor from a time that the rotational angle of the crank reaches the first prescribed angle until the rotational angle of the crank reaches a third prescribed angle. With the bicycle controller according to the ninth aspect, the limitation on the output of the motor is controlled based on the rotational angle of the crank. This allows the output of the motor to be accurately limited based on the rotational angle of the crank. Also, situations in which the assist power is reduced for a long period of time during the transmission are reduced.

In a tenth aspect of the invention, the bicycle controller according to any one of the preceding aspects is configured so that the electronic control unit is further configured to execute one of the first shifting operation and the second shifting operation in accordance with at least one of the number of steps in the transmission ratio to reach the requested transmission ratio and a second time that is required to move the transmission unit to the requested transmission ratio. With the bicycle controller according to the tenth aspect, the electronic control unit appropriately selects and executes one of the first shifting operation and the second shifting operation.

In an eleventh aspect of the invention, the bicycle controller according to any one of the preceding aspects is configured so that the electronic control unit is further configured to execute one of the first shifting operation and the second shifting operation in accordance with a second time that is required to move the transmission unit to the requested transmission ratio. In a case in which the first time is greater than or equal to the second time, the electronic control unit is further configured to execute the first shifting operation. In a case in which the first time is less than the second time, the electronic control unit is further configured to execute the second shifting operation. With the bicycle controller according to the eleventh aspect, if the transmission device is movable to the transmission ratio corresponding to the shift request within the first time, the first shifting operation is executed. If the transmission device cannot be moved to the transmission ratio corresponding to the shift request within the first time, the second shifting operation is executed.

In a twelfth aspect of the invention, the bicycle controller according to any one of the preceding aspects is configured so that the electronic control unit is further configured to execute one of the first shifting operation and the second shifting operation in accordance with a second time that is required to move the transmission unit to the requested transmission ratio. In a case in which an estimated time from a time that the rotational angle of the crank reaches the first prescribed angle to a time that the rotational angle of the crank reaches the third prescribed angle is greater than or equal to the second time, the electronic control unit is further configured to execute the first shifting operation. In a case in which the estimated time is less than the second time, the electronic control unit is further configured to execute the second shifting operation. With the bicycle controller according to the twelfth aspect, if the transmission unit is movable to the transmission ratio corresponding to the shift request within the time in which the rotational angle of the crank is moved from the first prescribed angle to the third prescribed angle, the first shifting operation is executed. If the transmission unit cannot be moved to the transmission ratio corresponding to the shift request with the time in which the rotational angle of the crank is moved from the first prescribed angle to the third prescribed angle, the second shifting operation is executed.

In a thirteenth aspect of the invention, a bicycle controller includes an electronic control unit that operates a transmission unit, which is configured to change transmission ratio of a bicycle in a stepped manner, in accordance with a shift request that changes the transmission ratio. The electronic control unit is configured to selectively execute one of a first shifting operation and a second shifting operation in a case in which the transmission ratio is changed in multiple steps in accordance with the shift request. In the first shifting operation, the electronic control unit is configured to start to operate the transmission unit upon detecting a rotational angle of a crank of the bicycle reaching a first prescribed angle and operate the transmission unit until reaching a requested transmission ratio that corresponds to the shift request. In the second shifting operation, the electronic control unit is configured to start to operate the transmission unit upon detecting the rotational angle of the crank of the bicycle reaching the first prescribed angle and operate the transmission unit until reaching an intermediate transmission ratio of the requested transmission ratio, and then upon the rotational angle of the crank reaching a second prescribed angle, the electronic control unit is configured to resume operation of the transmission unit to change from the intermediate transmission ratio to the requested transmission ratio. With the bicycle controller according to the thirteenth aspect, the electronic control unit controls the transmission unit in accordance with the content of the shift request that changes the transmission ratio. The electronic control unit limits the output of the motor in any one of a case that executes the first shifting operation and a case that executes the second shifting operation. This improves the transmission performance. Additionally, the electronic control unit starts to operate the transmission unit at a rotational angle of the crank that is suitable for starting the operation of the transmission unit.

In a fourteenth aspect of the invention, the bicycle controller according to the thirteenth aspect is configured so that the first prescribed angle is included in a range of 45 degrees from a first rotational angle corresponding to one of a top dead center and a bottom dead center of one of crank arms of the crank to an upstream side of the first rotational angle in a direction in which the crank is rotated to propel the bicycle. With the bicycle controller according to the fourteenth aspect, the electronic control unit starts to operate the transmission unit within a range of the rotational angle that is the most suitable for starting the operation of the transmission unit.

In a fifteenth aspect of the invention, the bicycle controller according to the fourteenth aspect is configured so that the second prescribed angle is included in a range of 45 degrees from a second rotational angle corresponding to the other one of the top dead center and the bottom dead center of the one of the crank arms to an upstream side of the second rotational angle in the first direction, or the second prescribed angle is equal to the first prescribed angle. With the bicycle controller according to the fifteenth aspect, the electronic control unit resumes the operation of the transmission unit within a range of the rotational angle that is the most suitable for starting the operation of the transmission unit.

In a sixteenth aspect of the invention, the bicycle controller according to the fourteenth or fifteenth aspect is configured so that the electronic control unit is further configured to execute one of the first shifting operation and the second shifting operation in accordance with at least one of the number of steps in the requested transmission ratio and a second time that is required to move the transmission unit to the requested transmission ratio. With the bicycle controller according to the sixteenth aspect, the electronic control unit appropriately selects and executes one of the first shifting operation and the second shifting operation.

In a seventeenth aspect of the invention, the bicycle controller according to the sixteenth aspect is configured so that the electronic control unit is further configured to execute the first shifting operation in a case in which a predetermined first time is greater than or equal to the second time. The electronic control unit is further configured to execute the second shifting operation in a case in which the predetermined first time is less than the second time. With the bicycle controller according to the seventeenth aspect, if the transmission unit is movable to the transmission ratio corresponding to the shift request within the first time, the first shifting operation is executed. If the transmission unit cannot be to the transmission ratio corresponding to the shift request within the first time, the second shifting operation is executed.

In an eighteenth aspect of the invention, the bicycle controller according to any one of the preceding aspects is configured so that the electronic control unit is further configured to receive an output signal from an operation unit, which is operable by a rider, as the shift request. With the bicycle controller according to the eighteenth aspect, the electronic control unit controls the transmission unit in accordance with a request of a manual transmission.

In a nineteenth aspect of the invention, the bicycle controller according to any one of the preceding aspects is configured so that the electronic control unit is further configured to selectively execute one of the first shifting operation and the second shifting operation upon detecting the operation unit being continuously operated for a predetermined first period or the operation unit being operated multiple times within a second predetermined period. With the bicycle controller according to the nineteenth aspect, the rider is allowed to request that the transmission ratio be changed in multiple steps by continuously operating the operation unit for the first predetermined time or longer or operating the operation unit multiple times within the second predetermined time.

In a twentieth aspect of the invention, a bicycle control system includes the bicycle controller according to any one of the preceding aspects, the transmission unit, the motor and the operation unit. With the bicycle control system according to the twentieth aspect, the bicycle control system controls the transmission unit in accordance with the content of the shift request that changes the transmission ratio.

In a twenty-first aspect of the invention, a bicycle controller includes an electronic control unit that controls a transmission unit, which is configured to change transmission ratio of a bicycle in a stepped manner, and that controls a motor, which assists propulsion of the bicycle, in accordance with a shift request that changes the transmission ratio. Upon the electronic control unit receiving the shift request, and a crank of the bicycle reaching a first prescribed angle, which is located at an upstream side of a rotational angle that corresponds to a top dead center or a bottom dead center in a first direction in which the crank is rotated to propel the bicycle, the electronic control unit is configured to limit output of the motor and starts to operate the transmission unit. The electronic control unit being configured to change the first prescribed angle further to the upstream side in the first direction in a case in which the transmission unit changes the transmission ratio in multiple steps in accordance with the shift request from a case in which the transmission unit changes the transmission ratio in only one step. With the bicycle control system according to the twenty-first aspect, the transmission unit is controlled in accordance with the content of the shift request that changes the transmission ratio. Even in a case in which the transmission ratio is changed in multiple steps, the transmission is performed in a region where the torque inputted to the crank is minimized.

The above bicycle controller and the bicycle control system that includes the bicycle controller are configured to control the transmission unit in accordance with the content of a shift request that changes the transmission ratio.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
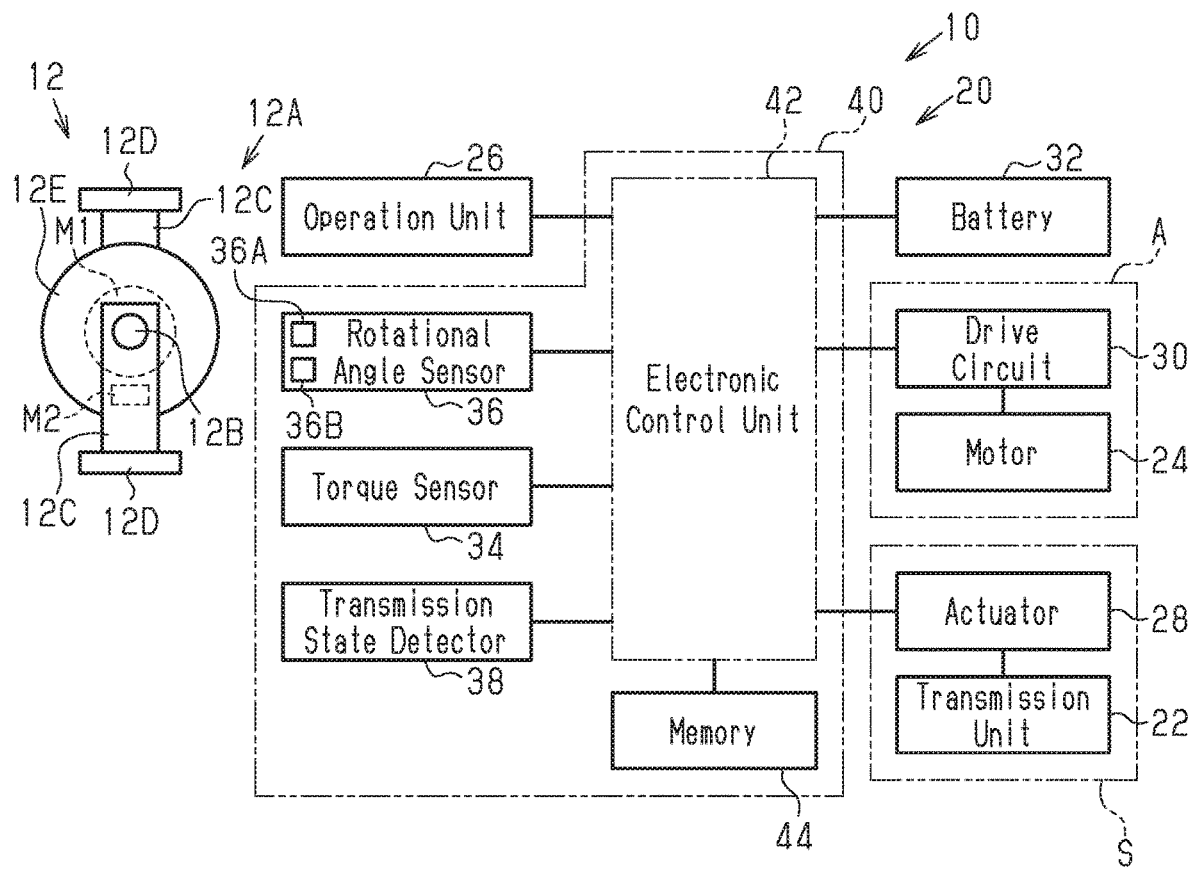
FIG. 1 is a block diagram showing an electrical configuration of a bicycle that includes a bicycle controller and a bicycle control system in accordance with a first embodiment.

A bicycle 10 that includes a first embodiment of a bicycle controller and a bicycle control system will now be described with reference to FIG. 1. The bicycle 10 includes a drive mechanism 12 and a bicycle control system 20. The drive mechanism 12 includes a crank 12A and a pair of pedals 12D. The crank 12A includes a crankshaft 12B and a pair of crank arms 12C. The drive mechanism 12 transmits manual (human) power that is applied to the pedals 12D to a rear wheel (not shown). The drive mechanism 12 is configured to transmit rotation of the crank 12A to the rear wheel, for example, through a chain, a belt, or a shaft (not shown). The drive mechanism 12 includes a front rotary body 12E that is coupled to the crankshaft 12B by a one-way clutch (not shown). The one-way clutch is configured to allow for forward rotation of the front rotary body 12E in a case in which the crank 12A is rotated forward and not to allow for rearward rotation of the front rotary body 12E in a case in which the crank 12A is rotated rearward. The front rotary body 12E includes a sprocket, a pulley, or a bevel gear (not shown). The front rotary body 12E can be coupled to the crankshaft 12B without the one-way clutch.

The bicycle control system 20 includes a bicycle controller 40, a transmission unit 22, a motor 24 and an operation unit 26. In one example, the bicycle control system 20 further includes an actuator 28 of the transmission unit 22, a drive circuit 30 of the motor 24, a battery 32, a torque sensor 34, a rotational angle sensor 36 and a transmission state detector 38.

The transmission unit 22 and the actuator 28 form a transmission device S. The transmission unit 22 is configured to change a transmission ratio r of the bicycle 10 in a stepped manner. In one example, the transmission unit 22 changes the speed of rotation that is inputted to the crankshaft 12B and transmits the rotation to the rear wheel. In this case, the transmission unit 22 includes an internal transmission. The internal transmission unit is arranged in the vicinity of the crankshaft 12B or a hub of the axle of the rear wheel. The internal transmission can be arranged in a power transmission path that extends between the crank 12A and the front rotary body 12E. In another example, the transmission unit 22 moves the chain between a plurality of front sprockets or a plurality of rear sprockets to change the speed of rotation that is inputted to the crankshaft 12B and transmits the rotation to the rear wheel. In this case, the transmission unit 22 includes a derailleur. The derailleur includes at least one of a front external transmission, which moves the chain between the front sprockets (not shown), and a rear external transmission, which moves the chain between the rear sprockets (not shown). The actuator 28 includes an electric motor. The actuator 28 is driven to allow the transmission unit 22 to perform a transmission operation to change the transmission ratio r of the bicycle 10 in a stepped manner. In a case in which the transmission unit 22 is an internal transmission, the transmission operation includes an operation that changes the coupling state of gears of a planetary gear mechanism located in the transmission unit 22. In a case in which the transmission unit 22 is an external transmission, the transmission operation includes an operation that moves the chain between sprockets. The internal transmission can include a continuously variable transmission (CVT) mechanism. In one example, the CVT mechanism includes a planetary mechanism that includes an input body, an output body and a transmission body. Rotation of the transmission body continuously changes the transmission ratio r. The transmission device S can include other components in addition to the transmission unit 22 and the actuator 28.

The motor 24 and the drive circuit 30 form an assist unit A. The drive circuit 30 controls electric power that is supplied from the battery 32 to the motor 24. The motor 24 assists propulsion of the bicycle 10. The motor 24 includes an electric motor. The motor 24 is arranged to transmit rotation to a manual power transmission path that extends from the pedals 12D to the rear wheel or to a front wheel (not shown). The motor 24 is arranged on a frame (not shown) of the bicycle 10, the rear wheel, or the front wheel. In one example, the motor 24 is connected to a power transmission path that extends from the crankshaft 12B to the front rotary body 12E. Preferably, a one-way clutch (not shown) is arranged in a power transmission path that extends between the motor 24 and the crankshaft 12B to prohibit rotation of the motor 24 that would be produced by rotation of the crank in the case of rotating the crankshaft 12B in a direction in which the bicycle 10 moves forward. The assist unit A can include other components in addition to the motor 24 and the drive circuit 30. The assist unit A can include, for example, a reduction gear that reduces the speed of rotation of the motor 24 and outputs the rotation.

The operation unit 26 is operable by the rider. The operation unit 26 is coupled to a handlebar (not shown) of the bicycle 10. The bicycle controller 40 includes an electronic control unit 42 that is communicable with the operation unit 26. The operation unit 26 and the electronic control unit 42 are connected to each other through wired or wireless communication. The operation unit 26 is communicable with the electronic control unit 42, for example, through power line communication (PLC). If the rider operates the operation unit 26, then the operation unit 26 transmits an output signal to the electronic control unit 42. The output signal includes a shift-up signal, which increases the transmission ratio r of the bicycle 10, or a shift-down signal, which decreases the transmission ratio r of the bicycle 10. The operation unit 26 includes, for example, an operation member, a sensor that detects movement of the operation member, and an electrical circuit that communicates with the electronic control unit 42 in accordance with an output signal of the sensor.

The operation unit 26 can be configured to output an output signal that corresponds to a multiple-step transmission. In one example, in a case in which an operation for increasing the transmission ratio r is continuously performed on the operation unit 26 for a first predetermined period TX or longer, the operation unit 26 transmits an output signal including the shift-up signal to the electronic control unit 42 multiple times. The number of times that the output signal is transmitted can be increased as the operation for increasing the transmission ratio r is performed on the operation unit 26 for a longer period of time. In a case in which an operation for decreasing the transmission ratio r is continuously performed on the operation unit 26 for the first predetermined period TX1 or longer, the operation unit 26 transmits an output signal including the shift-down signal to the electronic control unit 42 multiple times. The number of times that the output signal is transmitted can be increased as the operation for decreasing the transmission ratio r is performed on the operation unit 26 for a longer period of time. The operation unit 26 can transmit, to the electronic control unit 42, an output signal that corresponds to the period during which the operation unit 26 is operated within the first predetermined period TX1. In this case, the electronic control unit 42 updates a requested transmission ratio rA based on the number of steps in the transmission ratio r that is to be changed in accordance with the output signal corresponding to the period during which the operation unit 26 is operated.

In another example, in a case in which an operation for increasing the transmission ratio r is performed on the operation unit 26 multiple times within a second predetermined period TX2, the operation unit 26 transmits an output signal including the shift-up signal to the electronic control unit 42 each time the operation is performed. In a case in which an operation for decreasing the transmission ratio r is performed on the operation unit 26 multiple times within the second predetermined period TX2, the operation unit 26 transmits an output signal including the shift-down signal to the electronic control unit 42 each time the operation is performed. Each time the electronic control unit 42 receives the output signal, the electronic control unit 42 executes a first control that changes the requested transmission ratio rA. The operation unit 26 can transmit, to the electronic control unit 42, an output signal that corresponds to the number of times that the operation unit 26 is operated within the second predetermined period TX2. In this case, the electronic control unit 42 updates the requested transmission ratio rA based on the number of steps in the transmission ratio r that is to be changed in accordance with the output signal corresponding to the number of times that the operation unit 26 is operated.

The output signal of the operation unit 26 can include a request for changing the transmission ratio r in multiple steps. The operation unit 26 includes, for example, a switch that changes the transmission ratio r in multiple steps. In a case in which the electronic control unit 42 receives an output signal of the operation unit 26, the electronic control unit 42 can set a shift request that changes the transmission ratio r in multiple steps in accordance with the content of the signal or the control state of the bicycle 10.

The battery 32 includes one or more battery cells. The battery cells include a rechargeable battery. The battery 32 is mounted on the bicycle 10 to supply electric power to other electric components (e.g., the motor 24, the actuator 28 and the bicycle controller 40) that are electrically connected to the battery 32 by wires.

The torque sensor 34 outputs a signal corresponding to manual power T. The torque sensor 34 detects the manual power T applied to the crankshaft 12B. The torque sensor 34 can be arranged between the crankshaft 12B and the front rotary body 12E. Alternatively, the torque sensor 34 can be arranged on the crankshaft 12B, the front rotary body 12E, the crank arms 12C, or the pedals 12D. The torque sensor 34 can be realized by, for example, a strain sensor, a magnetostriction sensor, an optical sensor, or a pressure sensor. Any sensor can be used as the torque sensor 34 as long as the sensor outputs a signal corresponding to the manual power T applied to the crank arms 12C or the pedals 12D.

The rotational angle sensor 36 detects a rotational angle CA of the crank. The rotational angle sensor 36 is coupled to the frame of the bicycle 10 or a housing (not shown) of the assist unit A. The rotational angle sensor 36 includes a first element 36A and a second element 36B. The first element 36A detects the magnetic field of a first magnet M1. The second element 36B outputs a signal corresponding to the positional relationship between the second element 36B and a second magnet M2. The first magnet M1 is located on the crankshaft 12B or the crank arms 12C and coaxial with the crankshaft 12B. The first magnet M1 is an annular magnet in which different magnetic poles are alternately arranged beside one another in the circumferential direction. The first element 36A detects the rotational angle of the crank 12A relative to the frame. As the crank 12A rotates once, the first element 36A outputs a signal of cycles, each of which corresponds to the angle obtained by dividing 360 degrees by the number of the magnetic poles having the same polarity. The minimum value of the rotational angle of the crank 12A that is detectable by the rotational angle sensor 36 is 180 degrees or smaller. The minimum value is preferably fifteen degrees and, further preferably, six degrees. The second magnet M2 is located on the crankshaft 12B or the crank arms 12C. The second element 36B detects a reference angle of the crank 12A (e.g., top dead center or bottom dead center of crank 12A) relative to the frame. The second element 36B outputs a signal of cycles, each of which corresponds to one rotation of the crankshaft 12B.

The rotational angle sensor 36 can include a magnetic sensor that outputs a signal corresponding to the magnitude of the magnetic field instead of the first element 36A and the second element 36B. In this case, instead of the first magnet M1 and the second magnet M2, an annular magnet in which the magnitude of the magnetic field differs in the circumferential direction is coaxially arranged on the crankshaft 12B. Use of a magnetic sensor that outputs a signal corresponding to the magnitude of the magnetic field allows one sensor to detect the rotational speed N of the crank and the rotational angle of the crank 12A. This simplifies the structure and facilitates the assembling. The rotational angle sensor 36 can detect the rotational speed N of the crank in addition to the rotational angle CA of the crank. The rotational speed N of the crank can be detected from any one of the output of the first element 36A, the output of the second element 36B, and the output of the magnetic sensor.

The transmission state detector 38 detects the operation state of the transmission unit 22. In one example, the transmission unit 22 includes a moving portion (not shown) that moves in accordance with changes in the transmission ratio r, and the transmission state detector 38 detects the position of the moving portion. In another example, the transmission state detector 38 detects the transmission ratio r based on the rotational speed of the rear wheel relative to the rotational speed N of the crank.

The bicycle controller 40 includes the electronic control unit 42. In one example, it is preferred that the bicycle controller 40 further include a computer memory 44. The electronic control unit 42 includes an arithmetic processing unit that executes predetermined control programs. The arithmetic processing unit includes, for example, a central processing unit (CPU) or a micro processing unit (MPU). The electronic control unit 42 can include one or more microcomputers. The memory 44 stores information that is used in various kinds of control programs and various kinds of control processes. The memory 44 includes, for example, a nonvolatile memory and a volatile memory. The electronic control unit 42 further includes a timer.

The electronic control unit 42 receives an output signal from the operation unit 26 as a shift request. The electronic control unit 42 controls the transmission unit 22 and the motor 24 in accordance with a shift request that changes the transmission ratio r. More specifically, in a case in which the electronic control unit 42 receives an output signal including the shift-up signal as the shift request, the electronic control unit 42 executes the first control to increase the transmission ratio r that corresponds to the shift request (hereafter, referred to as "the requested transmission ratio rA") and that is stored in the memory 44. In a case in which the electronic control unit 42 receives an output signal including the shift-down signal as the shift request, the electronic control unit 42 executes the first control to decrease the requested transmission ratio rA that is stored in the memory 44.

Figure 2:
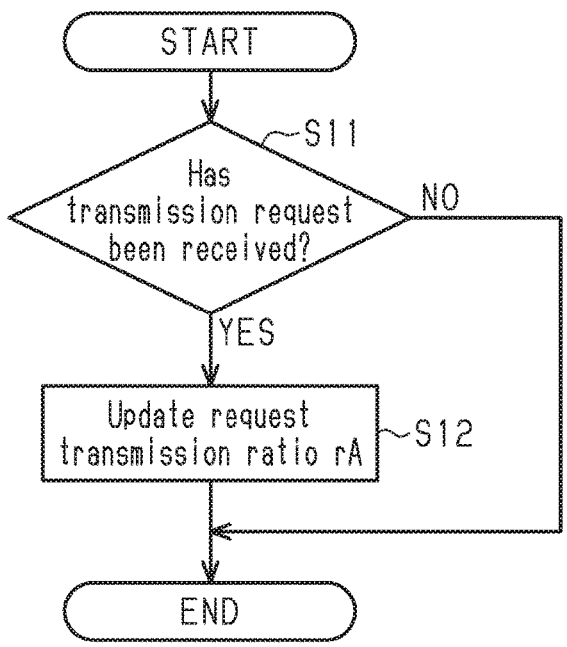
FIG. 2 is a flowchart of a first control executed by an electronic control unit of the bicycle controller shown in FIG. 1.

The first control will now be described with reference to FIG. 2. The electronic control unit 42 executes the first control in predetermined cycles as long as the bicycle controller 40 is supplied with power. In step S11, the electronic control unit 42 determines whether or not the shift request is received. If the shift request is received, the electronic control unit 42 proceeds to step S12 and updates the requested transmission ratio rA stored in the memory 44 and then again executes the process of step S11 after the predetermined cycle. If the shift request is not received in step S11, then the electronic control unit 42 again executes the process of step S11 after the predetermined cycle.

The electronic control unit 42 executes a second control that controls the transmission unit 22 and the motor 24 in accordance with the requested transmission ratio rA that is updated in the first control. In a case in which the transmission ratio r is changed in multiple steps in accordance with the shift request, the electronic control unit 42 selectively performs one of a first shifting operation and a second shifting operation. In a case in which the operation unit 26 is continuously operated for the first predetermined period TX1 or longer or the operation unit 26 is operated multiple times within the second predetermined period TX2, the electronic control unit 42 selectively performs one of the first shifting operation and the second shifting operation. The electronic control unit 42 selectively performs one of the first shifting operation and the second shifting operation in accordance with the shift request that is received before the rotational angle CA of the crank reaches a first prescribed angle CA1.

More specifically, the electronic control unit 42 performs one or neither of the first shifting operation and the second shifting operation based on the result of a comparison between the requested transmission ratio rA, which is updated by the shift request, and the transmission ratio r, which is detected by the transmission state detector 38. If the requested transmission ratio rA, which is updated by the shift request, conforms to the transmission ratio r, then the electronic control unit 42 does not perform any one of the first shifting operation and the second shifting operation. If the requested transmission ratio rA, which is updated by the shift request, differs from the transmission ratio r in only one step, then the electronic control unit 42 performs the first shifting operation. If the requested transmission ratio rA, which is updated by the shift request, differs from the transmission ratio r by two or more steps, then the electronic control unit 42 performs at least one of the first shifting operation and the second shifting operation in accordance with the requested transmission ratio rA and the difference between the requested transmission ratio rA and the transmission ratio r. If the requested transmission ratio rA exceeds the upper limit of the transmission ratio r that is feasible by the transmission unit 22, then the electronic control unit 42 does not perform a transmission that would exceed the upper limit of the transmission ratio r. Additionally, if the requested transmission ratio rA is less than the lower limit of the transmission ratio r that is feasible by the transmission unit 22, then the electronic control unit 42 does not perform a transmission that would become less than the lower limit of the transmission ratio r. In a case in which the electronic control unit 42 is configured to control a plurality of transmission units 22, the upper limit and the lower limit of the transmission ratio r refer to the upper limit and the lower limit of the transmission ratio of the bicycle 10 that is feasible by each of the transmission units 22. In the first control shown in FIG. 2, in step S12, the electronic control unit 42 can set the requested transmission ratio rA in a range from the lower limit to the upper limit of the requested transmission ratio rA.

The electronic control unit 42 performs one of the first shifting operation and the second shifting operation in accordance with a second time T2 that is required to move the transmission unit 22 to the requested transmission ratio rA. If a first time T1 is greater than or equal to the second time T2, then the electronic control unit 42 performs the first shifting operation. If the first time T1 is less than the second time T2, then the electronic control unit 42 performs the second shifting operation. The second time T2 varies in accordance with the difference between the requested transmission ratio rA and the transmission ratio r. In one example, the memory 44 stores a transmission time required to increase the transmission ratio r in one step and a transmission time required to decrease the transmission ratio r in one step. The electronic control unit 42 calculates the second time T2 by adding the transmission times stored in the memory 44 based on the present transmission ratio r and the requested transmission ratio rA. The first time T1 is set to the time that allows for a one-step transmission at any transmission ratio r. The transmission ratio r can have the same transmission time or different transmission times in each step. The transmission time can be set by the electronic control unit 42 in accordance with the properties and performance of the transmission unit 22. For example, the electronic control unit 42 can be connected to an external device such as a personal computer through wireless or wired communication to set the transmission time.

In the first shifting operation, the electronic control unit 42 limits the output of the motor 24 and operates the transmission unit 22 until the transmission ratio becomes the requested transmission ratio rA. If the electronic control unit 42 receives the shift request, and the rotational angle CA of the crank of the bicycle 10 reaches the first prescribed angle CA1, then the electronic control unit 42 limits the output of the motor 24 and starts to operate the transmission unit 22. The electronic control unit 42 limits the output of the motor 24 until the first time T1 elapses from the time that the rotational angle CA of the crank reaches the first prescribed angle CA1. At the time that the first time T1 has elapsed, the electronic control unit 42 reduces the limitation on the output of the motor 24. It is preferred that, at the time that the first time T1 has elapsed, the electronic control unit 42 stop the limitation on the output of the motor 24 and control the motor 24 at the assist ratio that was used immediately before the output of the motor 24 was started to be limited.

The first prescribed angle CA1 is included in a range of 45 degrees from a first rotational angle CX1 corresponding to one of the top dead center and the bottom dead center of one of the crank arms 12C of the crank 12A to the upstream side of the first rotational angle CX1 in a first direction in which the crank 12A is rotated to propel the bicycle 10. The first direction is the direction in which the crank 12A is rotated to move the bicycle 10 forward. If the rotational angle CA of the crank is 0 degrees in a state in which one of the crank arms 12C of the crank 12A is located in the top dead center, then the rotational angle CA of the crank is 180 degrees in a state in which the one of the crank arms 12C of the crank 12A is located in the bottom dead center. In this case, the first rotational angle CX1 is one of 0 degrees and 180 degrees. Also, in this case, the first prescribed angle CA1 is included in one of a range from −45 degrees (315 degrees) to 0 degrees and a range from 135 degrees to 180 degrees. In a case in which the first rotational angle CX1 is set to 0 degrees, the first prescribed angle CA1 is included in the range from −45 degrees (315 degrees) to 0 degrees. In a case in which the first rotational angle CX1 is set to 180 degrees, the first prescribed angle CA1 is included in the range from 135 degrees to 180 degrees. The electronic control unit 42 can select any one of 0 degrees and 180 degrees for the first rotational angle CX1. For example, if the rotational angle CA of the crank is in the range from 135 degrees to 315 degrees at the time of reception of the shift request, then the electronic control unit 42 sets the first rotational angle CX1 to 360 (0) degrees. In this case, the first prescribed angle CA1 is included in a range from 315 degrees to 360 (0) degrees of the next rotation cycle. If the rotational angle CA of the crank is in the range from 315 degrees to 135 degrees of the next rotation cycle at the time of reception of the shift request, then the electronic control unit 42 sets the first rotational angle CX1 to 180 degrees. In this case, the first prescribed angle CA1 is included in a range from 135 degrees to 180 degrees of the next rotation cycle.

In the second shifting operation, the electronic control unit 42 limits the output of the motor 24 and operates the transmission unit 22 until the transmission ratio r reaches an intermediate transmission ratio r of the requested transmission ratio rA. Then, after temporarily reducing the limitation on the output of the motor 24, the electronic control unit 42 again limits the output of the motor 24 and operates the transmission unit 22. In the second shifting operation, after the electronic control unit 42 temporarily reduces the limitation on the output of the motor 24, if the rotational angle CA of the crank of the bicycle 10 reaches a second prescribed angle CA2, then the electronic control unit 42 limits the output of the motor 24 and starts to operate the transmission unit 22. The electronic control unit 42 limits the output of the motor 24 until the first time T1 elapses from the time that the rotational angle CA of the crank reaches the second prescribed angle CA2. At the time that the first time T1 has elapsed, the electronic control unit 42 reduces the limitation on the output of the motor 24. It is preferred that, at the time that the first time T1 has elapsed, the electronic control unit 42 stop the limitation on the output of the motor 24 and control the motor 24 at the assist ratio that was used immediately before the output of the motor 24 was started to be limited.

In one example, the second prescribed angle CA2 is equal to the first prescribed angle CA1. The second prescribed angle CA2 is included in a range of 45 degrees from a second rotational angle CX2 corresponding to one of the top dead center and the bottom dead center of one of the crank arms 12C of the crank 12A to the upstream side of the second rotational angle CX2 in the first direction. In this case, if the first rotational angle CX1 is 0 degrees, the second rotational angle CX2 is 0 degrees, and the second prescribed angle CA2 is included in the range from −45 degrees (215 degrees) to 0 degrees. If the first rotational angle CX1 is 180 degrees, then the second rotational angle CX2 is 180 degrees, and the second prescribed angle CA2 is included in the range from 135 degrees to 180 degrees.

In another example, the second prescribed angle CA2 differs from the first prescribed angle CA1 The second prescribed angle CA2 is located at the upstream side or the downstream side of the first prescribed angle CA1 in the first direction. In one example, the second prescribed angle CA2 is located at the downstream side of the first prescribed angle CA1 and separated by 180 degrees. The second prescribed angle CA2 is included in a range of 45 degrees from a second rotational angle CX2 corresponding to the other one of the top dead center and the bottom dead center of the one of the crank arms 12C of the crank 12A to the upstream side of the second rotational angle CX2 in the first direction. In this case, if the first rotational angle CX1 is 0 degrees, then the second rotational angle CX2 is 180 degrees, and the second prescribed angle CA2 is included in the range from 135 degrees to 180 degrees. If the first rotational angle CX1 is 180 degrees, then the second rotational angle CX2 is 0 degrees, and the second prescribed angle CA2 is included in the range from −45 degrees (315 degrees) to 0 degrees.

The second control will now be described with reference to FIG. 3. The electronic control unit 42 executes the second control in predetermined cycles as long as the bicycle controller 40 is supplied with power. Here, the description focuses on a case in which the first prescribed angle CA1 is equal to the second prescribed angle CA2. In one example, the first rotational angle CX1 corresponds to one of 0 degrees and 180 degrees. The second rotational angle CX2 corresponds to one of 0 degrees and 180 degrees. In this case, the second control is executed only once while the crank 12A is rotated once.

In step S21, the electronic control unit 42 detects the transmission ratio r and proceeds to step S22. In step S22, the electronic control unit 42 determines whether or not the requested transmission ratio rA conforms to the transmission ratio r. More specifically, the electronic control unit 42 compares the requested transmission ratio rA, which is updated in the first control shown in FIG. 2, and the transmission ratio r, which is detected by the transmission state detector 38. If the requested transmission ratio rA conforms to the transmission ratio r, the electronic control unit 42 ends the process. If the requested transmission ratio rA differs from the transmission ratio r, the electronic control unit 42 proceeds to step S23.

In step S23, the electronic control unit 42 calculates the second time T2. If the second time T2 is less than the first time T1, then the electronic control unit 42 sets the requested transmission ratio rA as a target transmission ratio rX. If the second time T2 is greater than or equal to the first time T1, then the electronic control unit 42 sets the target transmission ratio rX to a transmission ratio r that is between the present transmission ratio r and the requested transmission ratio rA and is changeable by the transmission unit 22 within the first time T1. The target transmission ratio rX that is set in the case in which the second time T2 is greater than or equal to the first time T1 corresponds to the intermediate transmission ratio r.

In step S24, the electronic control unit 42 determines whether or not the rotational angle CA of the crank has reached the first prescribed angle CA1. If the electronic control unit 42 determines that the rotational angle CA of the crank has not reached the first prescribed angle CA1, then the electronic control unit 42 ends the process. After a predetermined cycle, the electronic control unit 42 again executes the processes from step S21. If the requested transmission ratio rA is changed in the first control before step S22 is performed in the next control cycle of the second control, the electronic control unit 42 performs the determination of step S22 based on the changed requested transmission ratio rA. Thus, the electronic control unit 42 executes the processes from step S22 in accordance with the shift request received before the rotational angle CA of the crank reaches the first prescribed angle CA1. If the electronic control unit 42 determines the rotational angle CA of the crank has reached the first prescribed angle CA1 in step S24, then the electronic control unit 42 starts to limit the output of the motor 24 in step S25 and proceeds to step S26. In step S26, the electronic control unit 42 performs the transmission operation on the transmission unit 22 until the transmission ratio r is changed to the target transmission ratio rX that is set in step S23. If the present transmission ratio r differs from the target transmission ratio rX by two or more steps, then the electronic control unit 42 continuously operates the transmission unit 22.

In step S27, the electronic control unit 42 determines whether or not the first time T1 has elapsed. More specifically, the electronic control unit 42 determines whether or not the time after the rotational angle CA of the crank has reached the first prescribed angle CA1 is greater than or equal to the first time T1. In another example, in step S27, the electronic control unit 42 determines whether or not the time after the output of the motor 24 is started to be limited is greater than or equal to the first time T1. The electronic control unit 42 repeats the determination of step S27 until the first time T1 elapses. If the electronic control unit 42 determines that the first time T1 has elapsed, then the electronic control unit 42 proceeds to step S28 and reduces the limitation on the output of the motor 24 and ends the process. In one example, the electronic control unit 42 controls the output of the motor 24 under the same condition as the condition used before the output of the motor 24 was limited in step S25 and stops the limitation on the output of the motor 24.

If the target transmission ratio rX set in step S23 is not equal to the requested transmission ratio rA, and the requested transmission ratio rA is not updated during a period prior to step S22 in the next control cycle of the second control or the difference between the present transmission ratio r and the requested transmission ratio rA is increased, then the electronic control unit 42 executes the second control so that the transmission ratio r becomes closer to the requested transmission ratio rA in the next control cycle of the second control. Thus, although the limitation on the output of the motor 24 was reduced in step S28 of the previous control cycle of the second control, the limitation on the output of the motor 24 is resumed at the time that the rotational angle CA of the crank again reaches the first prescribed angle CA1.

The second control executed in a case in which the first prescribed angle CA1 differs from the second prescribed angle CA2 will now be described with reference to FIG. 4. The electronic control unit 42 performs the processes of steps S21 to S28 shown in FIG. 3 through the same procedures as the second control executed in a case in which the first prescribed angle CA1 is equal to the second prescribed angle CA2.

After the electronic control unit 42 reduces the limitation on the output of the motor 24 in step S28, the electronic control unit 42 proceeds to step S62 and determines whether or not the requested transmission ratio rA conforms to the transmission ratio r through the same process as step S22. If the requested transmission ratio rA differs from the transmission ratio r, then the electronic control unit 42 proceeds to step S63.

In step S63, the electronic control unit 42 calculates a fourth time T4 that is required to move the transmission unit 22 to the requested transmission ratio rA. If the fourth time T4 is less than a third time T3 that is prestored in the memory 44 in advance, then the electronic control unit 42 sets the requested transmission ratio rA as the target transmission ratio rX. In one example, the third time T3 is equal to the first time T1. If the fourth time T4 is greater than or equal to the third time T3, then the electronic control unit 42 sets the target transmission ratio rX to a transmission ratio r that is between the present transmission ratio r and the requested transmission ratio rA and is changeable by the transmission unit 22 within the third time T3. The target transmission ratio rX that is set in the case in which the fourth time T4 is greater than or equal to the third time T3 corresponds to the intermediate transmission ratio r.

In step S64, the electronic control unit 42 determines whether or not the rotational angle CA of the crank has reached the second prescribed angle CA2. If the electronic control unit 42 determines that the rotational angle CA of the crank has not reached the second prescribed angle CA2, then the electronic control unit 42 ends the process. After a predetermined cycle, the electronic control unit 42 again executes the processes from step S21 shown in FIG. 3. If the electronic control unit 42 determines that the rotational angle CA of the crank has reached the second prescribed angle CA2 in step S64, then the electronic control unit 42 starts to limit the output of the motor 24 in step S65 and proceeds to step S66. During the period from step S28 to step S64, the limitation on the output of the motor 24 is reduced. Thus, the limitation on the output of the motor 24 is resumed in step S65. In step S66, the electronic control unit 42 performs the transmission operation on the transmission unit 22 until the transmission ratio r is changed to the target transmission ratio rX that was set in step S63. If the present transmission ratio r differs from the target transmission ratio rX by two or more steps, then the electronic control unit 42 continuously operates the transmission unit 22.

In step S67, the electronic control unit 42 determines whether or not the third time T3 has elapsed. More specifically, the electronic control unit 42 determines whether or not the time after the rotational angle CA of the crank has reached the second prescribed angle CA2 is greater than or equal to the third time T3. In another example, in step S67, the electronic control unit 42 determines whether or not the time after the output of the motor 24 is started to be limited is greater than or equal to the third time T3. The electronic control unit 42 repeats the determination of step S67 until the third time T3 elapses. If the electronic control unit 42 determines that the third time T3 has elapsed, then the electronic control unit 42 reduces the limitation on the output of the motor 24 in step S68 and ends the process. In one example, the electronic control unit 42 controls the output of the motor 24 under the same condition as the condition used before the output of the motor 24 was limited in step S65 and stops the limitation on the output of the motor 24.

Figure 5:
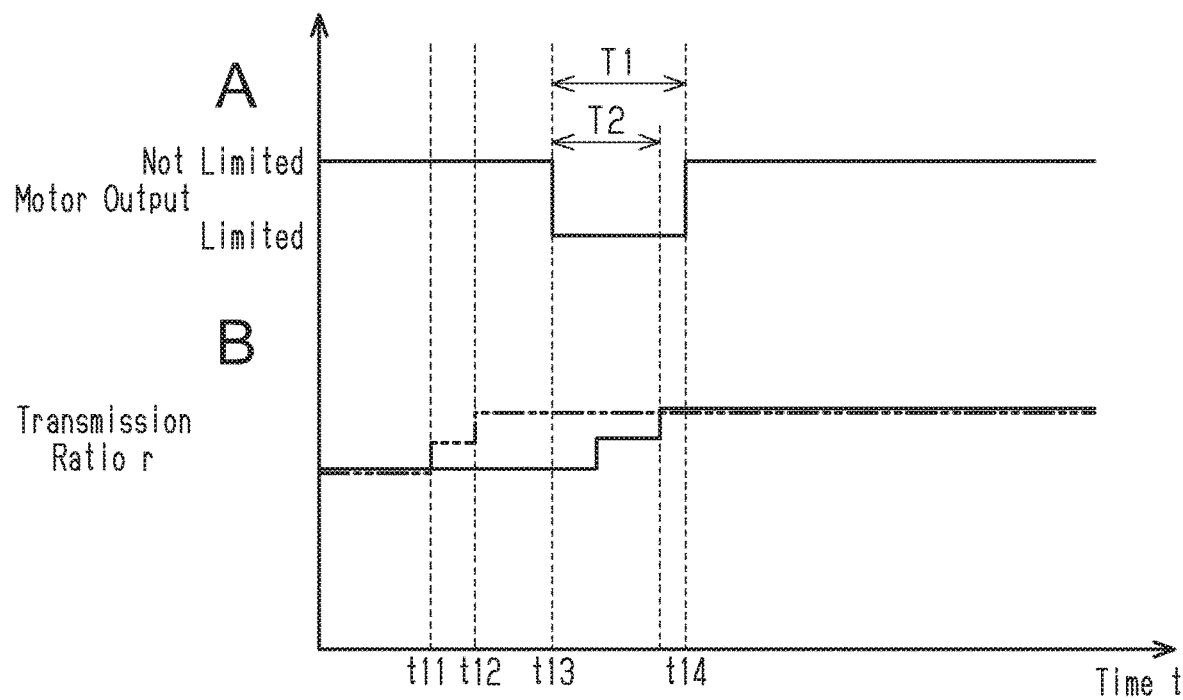
FIG. 5 is a pair of timing charts showing one example of the second control performed in a first shifting operation.

The execution mode of the first shifting operation performed in the first control and the second control will now be described with reference to FIG. 5. In FIG. 5, the double-dashed line in timing chart B indicates the requested transmission ratio rA, and the solid line indicates the transmission ratio r.

Time t11 indicates the time at which the operation unit 26 is operated to transmit an output signal including the shift-up signal to the electronic control unit 42. The electronic control unit 42 executes the first control to increase the requested transmission ratio rA in one step.

Time t12 indicates the time at which the operation unit 26 is operated to transmit an output signal including the shift-up signal to the electronic control unit 42. The electronic control unit 42 executes the first control to further increase the requested transmission ratio rA, which was changed at time t11, in one step.

Time t13 indicates the time at which the rotational angle CA of the crank reaches the first prescribed angle CA1 The electronic control unit 42 compares the transmission ratio r and the requested transmission ratio rA. Here, the second time T2, which is required to increase the transmission ratio r by two steps, is less than or equal to the first time T1. Thus, the electronic control unit 42 sets the target transmission ratio rX to the transmission ratio r that is greater than the present transmission ratio r by two steps. At time t13, the electronic control unit 42 starts to limit the output of the motor 24. In addition to starting the limitation on the output of the motor 24, the electronic control unit 42 controls the transmission unit 22 to start to change the transmission ratio r by two steps. It is preferred that the transmission unit 22 be operated after the output of the motor 24 is started to be limited. However, the limitation on the output of the motor 24 and the operation of the transmission unit 22 can be simultaneously started. Alternatively, the operation of the transmission unit 22 can be started immediately before the output of the motor 24 is started to be limited.

Time t14 indicates the time at which the first time T1 elapses from time t13. The electronic control unit 42 stops the limitation on the output of the motor 24.

Figure 6:
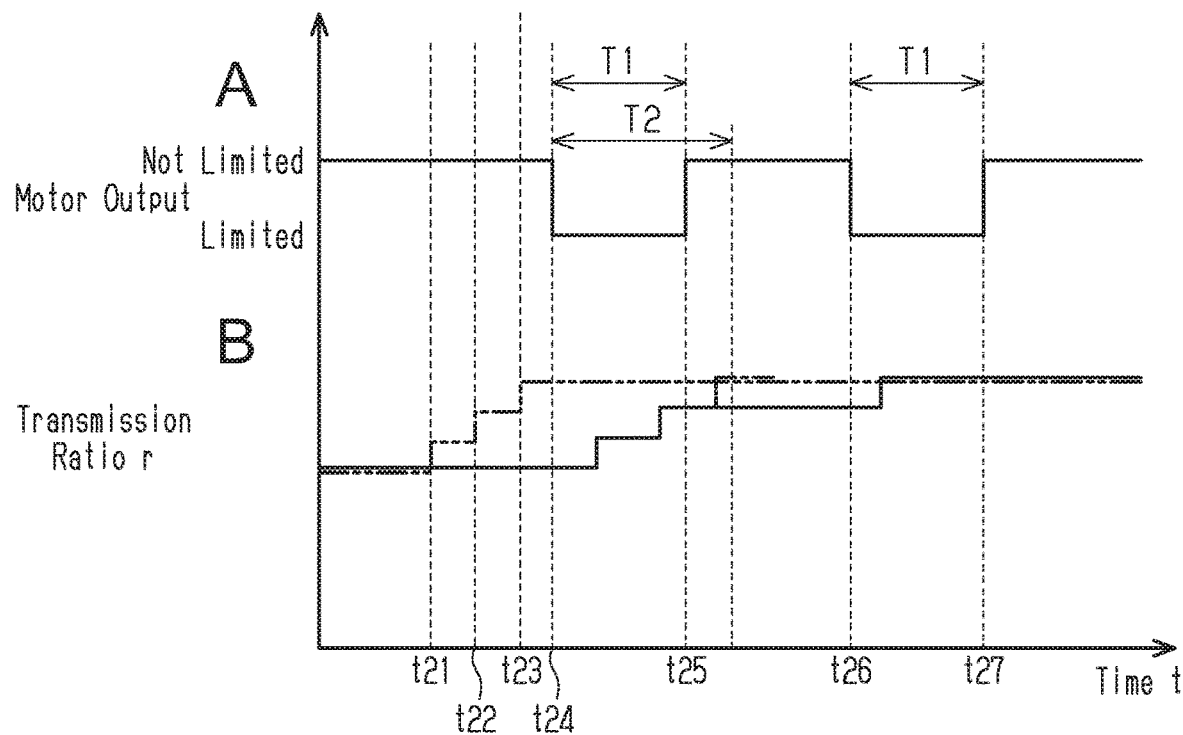
FIG. 6 is a pair of timing charts showing one example of the second control performed in a second shifting operation.

The execution mode of the second shifting operation performed in the first control and the second control will now be described with reference to FIG. 6. In FIG. 6, the double-dashed line in timing chart B indicates the requested transmission ratio rA, and the solid line indicates the transmission ratio r. The single-dashed line in timing chart B of FIG. 6 shows the transmission ratio r that is changed in a case in which the operation of the transmission unit 22 is continued until the transmission ratio r becomes the requested transmission ratio rA without interrupting the operation of the transmission unit 22 at time t25.

Time t21 indicates the time at which the operation unit 26 is operated to transmit an output signal including the shift-up signal to the electronic control unit 42. The electronic control unit 42 executes the first control to increase the requested transmission ratio rA in one step.

Time t22 indicates the time at which the operation unit 26 is operated to transmit an output signal including the shift-up signal to the electronic control unit 42. The electronic control unit 42 executes the first control to further increase the requested transmission ratio rA, which was changed at time t21, in one step.

Time t23 indicates the time at which the operation unit 26 is operated to transmit an output signal including the shift-up signal to the electronic control unit 42. The electronic control unit 42 executes the first control to further increase the requested transmission ratio rA, which was changed at time t22, in one step.

Time t24 indicates the time at which the rotational angle CA of the crank reaches the first prescribed angle CA1 The electronic control unit 42 compares the transmission ratio r and the requested transmission ratio rA. In a case in which the second time T2 required to obtain the transmission ratio r that is greater than the present transmission ratio r by three steps is greater than or equal to the first time T1, and the second time T2 required to obtain the transmission ratio r that is greater than the present transmission ratio r by two steps is less than or equal to the first time T1, the electronic control unit 42 sets the target transmission ratio rX to the transmission ratio r that is greater than the present transmission ratio r by two steps and starts to limit the output of the motor 24 at time t24. In addition to starting the limitation on the output of the motor 24, the electronic control unit 42 controls the transmission unit 22 to start to change the transmission ratio r by two steps. It is preferred that the transmission unit 22 be operated after the output of the motor 24 is started to be limited. However, the limitation on the output of the motor 24 and the operation of the transmission unit 22 can be simultaneously started. Alternatively, the operation of the transmission unit 22 can be started immediately before the output of the motor 24 is started to be limited. In this case, the transmission ratio r that is greater than the present transmission ratio r by two steps corresponds to the intermediate transmission ratio r.

Time t25 indicates the time at which the first time T1 elapses from time t24. The electronic control unit 42 reduces the limitation on the output of the motor 24.

Time t26 indicates the time at which the rotational angle CA of the crank reaches the second prescribed angle CA2. The electronic control unit 42 compares the present transmission ratio r and the requested transmission ratio rA, calculates the transmission ratio r that is greater than the present transmission ratio r in one step as the target transmission ratio rX, and starts to limit the output of the motor 24. Additionally, the electronic control unit 42 controls the transmission unit 22 to change the transmission ratio r in one step.

Time t27 indicates the time at which the first time T1 elapses from time t26. The electronic control unit 42 stops the limitation on the output of the motor 24. In a case in which the first prescribed angle CA1 differs from the second prescribed angle CA2, time t27 indicates the time at which the third time T3 elapses from time t26.

Second Embodiment

A second embodiment of the bicycle controller 40 will now be described with reference to FIGS. 1 and 7. The same reference characters are given to those components that are the same as the corresponding components of the first embodiment. Such components will not be described in detail. Instead of the first control and the second control of the first embodiment, a third control is executed in the second embodiment.

The electronic control unit 42 receives an output signal from the operation unit 26 as the shift request. The electronic control unit 42 controls the transmission unit 22 and the motor 24 in accordance with the shift request, which changes the transmission ratio r. More specifically, in a case in which the electronic control unit 42 receives an output signal including the shift-up signal as the shift request, the electronic control unit 42 performs the third control on the requested transmission ratio rA to increase the transmission ratio r. In a case in which the electronic control unit 42 receives an output signal including the shift-down signal as the shift request, the electronic control unit 42 performs the third control on the requested transmission ratio rA to decrease the transmission ratio r.

The third control will now be described with reference to FIG. 7. The electronic control unit 42 executes the third control in predetermined cycles as long as the bicycle controller 40 is supplied with power. In step S31, the electronic control unit 42 determines whether or not the shift request is received. If the shift request is not received, then the electronic control unit 42 ends the process and again executes the determination process of step S31 in each predetermined cycle. If the shift request is received, then the electronic control unit 42 proceeds to step S32.

The electronic control unit 42 detects the transmission ratio r in step S32 and proceeds to step S33. In step S33, the electronic control unit 42 determines whether or not the requested transmission ratio rA conforms to the transmission ratio r. More specifically, the electronic control unit 42 compares the requested transmission ratio rA, which is included in the output signal from the operation unit 26, and the transmission ratio r, which is detected by the transmission state detector 38. If the requested transmission ratio rA conforms to the transmission ratio r, then the electronic control unit 42 ends the process. If the requested transmission ratio rA differs from the transmission ratio r, then the electronic control unit 42 proceeds to step S34.

The electronic control unit 42 calculates the second time T2 required to move the transmission unit 22 to the requested transmission ratio rA in step S34 and proceeds to step S35. In step S35, the electronic control unit 42 determines whether or not the rotational angle CA of the crank has reached the first prescribed angle CA1. If the electronic control unit 42 determines that the rotational angle CA of the crank has not reached the first prescribed angle CA1, then the electronic control unit 42 repeats the process of step S35 until the rotational angle CA of the crank reaches the first prescribed angle CA1. If the electronic control unit 42 determines that the rotational angle CA of the crank has reached the first prescribed angle CA1, then the electronic control unit 42 starts to limit the output of the motor 24 in step S36 and proceeds to step S37. In step S37, the electronic control unit 42 performs the transmission operation on the transmission unit 22 until the transmission ratio r becomes the requested transmission ratio rA. If the present transmission ratio r differs from the requested transmission ratio rA by two or more steps, then the electronic control unit 42 continuously operates the transmission unit 22.

In step S38, the electronic control unit 42 determines whether or not the second time T2 has elapsed. More specifically, the electronic control unit 42 determines whether or not the time after the rotational angle CA of the crank has reached the first prescribed angle CA1 is greater than or equal to the second time T2. In another example, the electronic control unit 42 determines whether or not the time after the output of the motor 24 is started to be limited is greater than or equal to the second time T2. The electronic control unit 42 repeats the determination of step S38 until the second time T2 elapses. If the electronic control unit 42 determines that the second time T2 has elapsed, then the electronic control unit 42 stops the limitation on the output of the motor 24 in step S39 and ends the process. In one example, the electronic control unit 42 controls the output of the motor 24 under the same condition as the condition used before the output of the motor 24 was limited in step S36 and stops the limitation on the output of the motor 24.

Third Embodiment

A third embodiment of the bicycle controller 40 will now be described with reference to FIGS. 1 and 8. The same reference characters are given to those components that are the same as the corresponding components of the second embodiment. Such components will now be described in detail. The third embodiment executes a fourth control that differs from the third control of the second embodiment in that the first prescribed angle CA1 is changed in accordance with the shift request.

If the rotational angle CA of the crank reaches the first prescribed angle CA1, then the electronic control unit 42 limits the output of the motor 24 and starts to operate the transmission unit 22. In a case in which the transmission unit 22 changes the transmission ratio r in multiple steps in accordance with the shift request, the electronic control unit 42 changes the first prescribed angle CA1 further to the upstream side in the first direction from a case in which the transmission unit 22 changes the transmission ratio r in only one step in accordance with the shift request.

The fourth control will now be described with reference to FIG. 8. The electronic control unit 42 executes the fourth control in predetermined cycles as long as the bicycle controller 40 is supplied with power. In step S31, the electronic control unit 42 determines whether or not the shift request is received. If the shift request is not received, then the electronic control unit 42 ends the process and again executes the determination process of step S31 in each predetermined cycle. If the shift request is received, then the electronic control unit 42 proceeds to step S32.

The electronic control unit 42 detects the transmission ratio r in step S32 and proceeds to step S33. In step S33, the electronic control unit 42 determines whether or not the requested transmission ratio rA conforms to the transmission ratio r. More specifically, the electronic control unit 42 compares the requested transmission ratio rA, which is included in the output signal from the operation unit 26, and the transmission ratio r, which is detected by the transmission state detector 38. If the requested transmission ratio rA conforms to the transmission ratio r, then the electronic control unit 42 ends the process. If the requested transmission ratio rA differs from the transmission ratio r, the electronic control unit 42 proceeds to step S41.

In step S41, the electronic control unit 42 calculates a second time T2 that is required to move the transmission unit 22 to the requested transmission ratio rA and sets the first prescribed angle CA1 corresponding to the second time T2. Then, the electronic control unit 42 proceeds to step S35. If the transmission unit 22 changes the transmission ratio r in only one step in accordance with the shift request, then the electronic control unit 42 sets the first prescribed angle CA1 to the initial value of the first prescribed angle CA1 that is stored in the memory 44 in advance. If the transmission unit 22 changes the transmission ratio r in multiple steps in accordance with the shift request, then the electronic control unit 42 changes the first prescribed angle CA1 further to the upstream side in the first direction as the second time T2 becomes longer. The memory 44 can store a table that associates the second time T2 with the first prescribed angle CA1 or a function of the first prescribed angle CA1 and the second time T2. The electronic control unit 42 can obtain the first prescribed angle CA1 from the second time T2 through a calculation using the association table or the function, which is stored in the memory 44.

In step S35, the electronic control unit 42 determines whether or not the rotational angle CA of the crank has reached the first prescribed angle CA1 that was set in step S41. If the electronic control unit 42 determines that the rotational angle CA of the crank has not reached the first prescribed angle CA1, then the electronic control unit 42 repeats the process of step S35 until the rotational angle CA of the crank reaches the first prescribed angle CA1. If the electronic control unit 42 determines that the rotational angle CA of the crank has reached the first prescribed angle CA1, then the electronic control unit 42 starts to limit the output of the motor 24 in step S36 and proceed to step S37. In step S37, the electronic control unit 42 performs the transmission operation on the transmission unit 22 until the transmission ratio r becomes the requested transmission ratio rA. If the present transmission ratio r differs from the requested transmission ratio rA by two or more steps, then the electronic control unit 42 continuously operates the transmission unit 22.

In step S38, the electronic control unit 42 determines whether or not the second time T2 has elapsed. More specifically, the electronic control unit 42 determines whether or not the time after the rotational angle CA of the crank has reached the first prescribed angle CA1 is greater than or equal to the second time T2. In another example, the electronic control unit 42 determines whether or not the time after the output of the motor 24 is started to be limited is greater than or equal to the second time T2. The electronic control unit 42 repeats the determination of step S38 until the second time T2 elapses. If the electronic control unit 42 determines that the second time T2 has elapsed, then the electronic control unit 42 stops the limitation on the output of the motor 24 in step S39 and ends the process. In one example, the electronic control unit 42 controls the output of the motor 24 under the same condition as the condition used before the output of the motor 24 was limited in step S39 and stops the limitation on the output of the motor 24.

Modifications

The above description illustrates embodiments of a bicycle controller and a bicycle control system according to the present invention and is not intended to be restrictive. The bicycle controller and the bicycle control system according to the present invention can be modified, for example, as follows. Further, two or more of the modifications can be combined. In the following modifications, the same reference characters are given to those components that are the same as the corresponding components of the above embodiments. Such components will not be described in detail.

Figure 3:
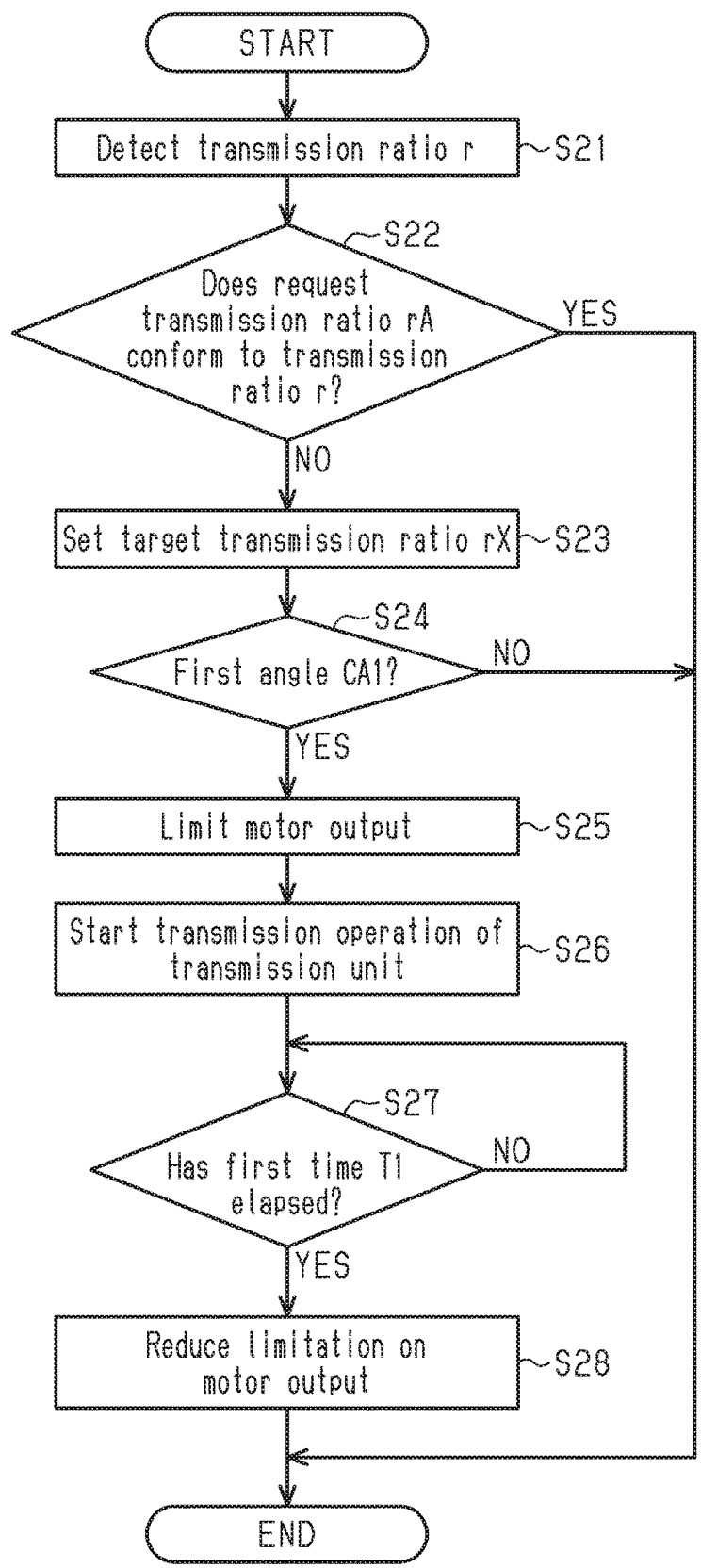
FIG. 3 is a flowchart of a second control executed by the electronic control unit of the bicycle controller shown in FIG. 1 in a case in which a first prescribed angle is equal to a second prescribed angle.
Figure 4:
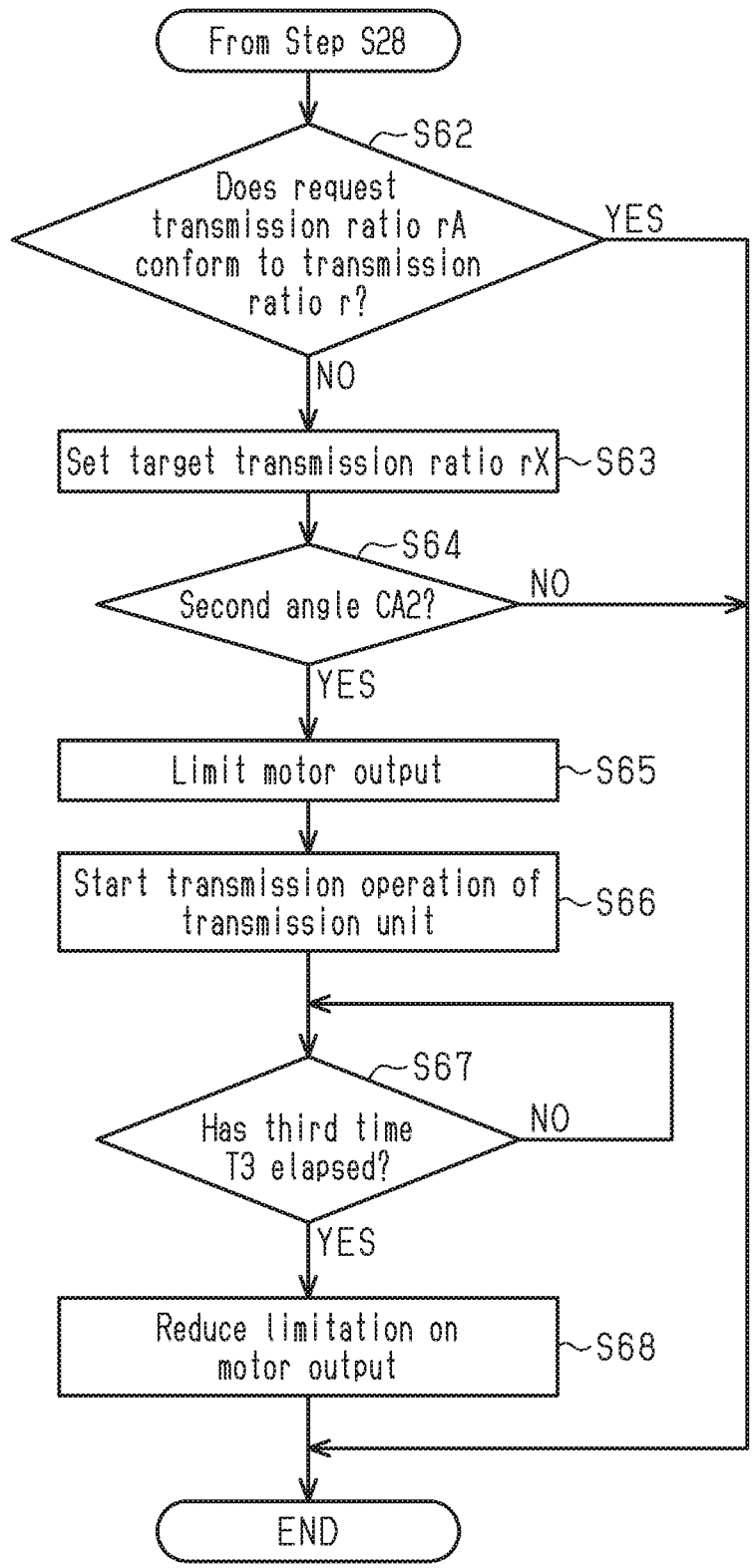
FIG. 4 is a flowchart of the second control executed by the electronic control unit of the bicycle controller shown in FIG. 1 in a case in which the first prescribed angle is not equal to the second prescribed angle.
Figure 9:
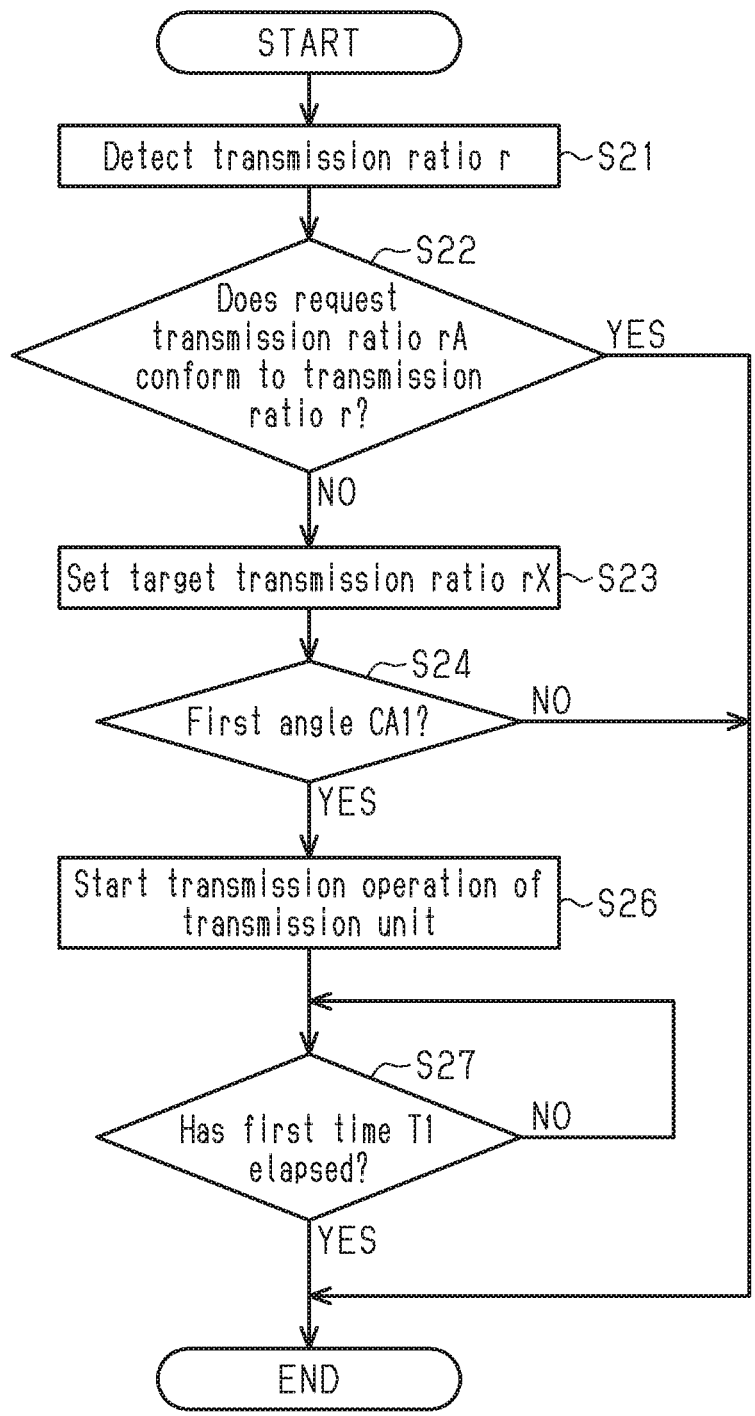
FIG. 9 is a flowchart showing a fifth control of a first modification.

The second control of the first embodiment shown in FIG. 3 can be changed to a fifth control shown in FIG. 9. In this modification, only the transmission unit 22 is controlled. Thus, the motor 24 is not controlled. The fifth control shown in FIG. 9 executes the processes that omit the processes of steps S25 and S28 from the second control shown in FIG. 3. If the first prescribed angle CA1 differs from the second prescribed angle CA2, then the processes of steps S65 and S68 shown in FIG. 4 are also omitted in the same manner as the processes of steps S25 and S28. In this modification, the fifth control shown FIG. 9 can be performed on the bicycle control system 20 that does not include the motor 24.

Figure 10:
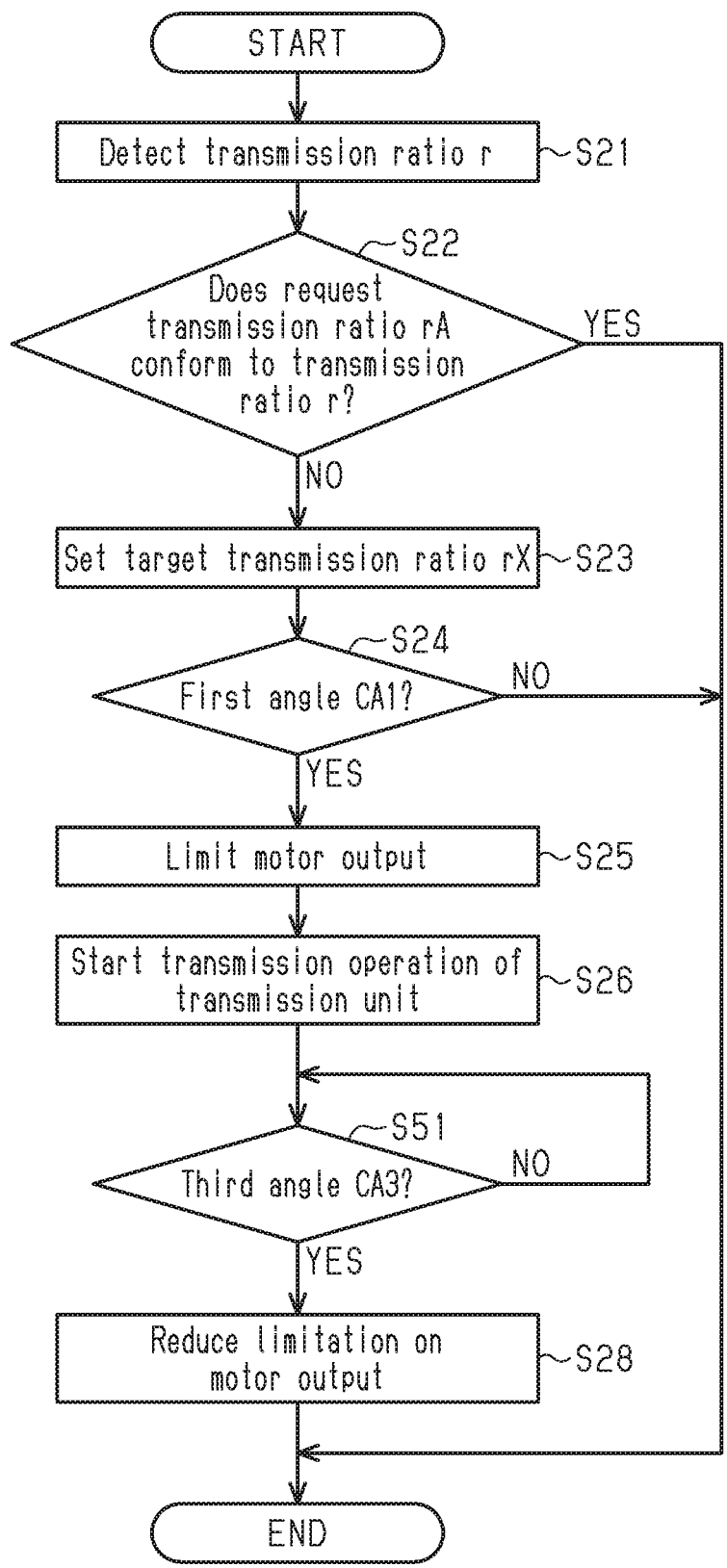
FIG. 10 is a flowchart showing a sixth control of a second modification.

The second control of the first embodiment shown in FIG. 3 can be changed to a sixth control shown in FIG. 10. In this modification, the electronic control unit 42 limits the output of the motor 24 from the time that the rotational angle CA of the crank reaches the first prescribed angle CA1 to the time that the rotational angle CA of the crank reaches a third prescribed angle CA3. More specifically, step S51 of FIG. 10 is performed instead of step S27 of FIG. 3. The electronic control unit 42 starts to limit the output of the motor 24 in step S25 and starts to perform the transmission operation on the transmission unit in step S26. Subsequently, in step S51, the electronic control unit 42 determines whether or not the rotational angle CA of the crank has reached the third prescribed angle CA3. In one example, the third prescribed angle CA3 is included in a range of 45 degrees from the first rotational angle CX1 corresponding to one of the top dead center and the bottom dead center of one of the crank arms 12C of the crank 12A to the downstream side of the first rotational angle CX1 in the first direction in which the crank 12A is rotated to propel the bicycle 10.

The modified example shown in FIG. 10 can be further changed as follows. In this modified example, the electronic control unit 42 executes the first shifting operation if an estimated time TA that takes the rotational angle CA of the crank to reaches the third prescribed angle CA3 from the first prescribed angle CA1 is greater than or equal to the second time T2. If the estimated time TA is less than the second time T2, then the electronic control unit 42 executes the second shifting operation. More specifically, in step S23 of FIG. 10, if the estimated time TA is greater than or equal to the second time T2, the electronic control unit 42 sets the requested transmission ratio rA as the target transmission ratio rX. Accordingly, the electronic control unit 42 executes the first shifting operation in the processes from step S24. If the estimated time TA is less than the second time T2 in step S23, then the electronic control unit 42 sets the target transmission ratio rX to a transmission ratio r that is between the present transmission ratio r and the requested transmission ratio rA and changeable by the transmission unit 22 within the estimated time TA. Accordingly, the electronic control unit 42 executes the second shifting operation in the processes from step S24 and the process of the sixth control performed next time and later. The electronic control unit 42 calculates the estimated time TA using the rotational speed N of the crank that is obtainable by the rotational angle sensor 36.

The first embodiment can be changed as follows. In this modified example, the electronic control unit 42 executes one of the first shifting operation and the second shifting operation in accordance with the number of steps in the transmission ratio r to reach the requested transmission ratio rA. More specifically, in step S23 of FIG. 3, if the number of steps in the transmission ratio r to reach the requested transmission ratio rA is less than or equal to a predetermined number of steps, the electronic control unit 42 sets the requested transmission ratio rA as the target transmission ratio rX. Accordingly, the electronic control unit 42 executes the first shifting operation in the processes from step S24. In step S23, if the number of steps in the transmission ratio r to reach the requested transmission ratio rA is greater than the predetermined number of steps, then the electronic control unit 42 sets the target transmission ratio rX to a transmission ratio r that is greater or smaller than the present transmission ratio r by the predetermined number of steps. Accordingly, the electronic control unit 42 executes the second shifting operation in the processes from step S24 and the process of the second control performed next time and later. In this case, the transmission ratio r that is greater or smaller than the present transmission ratio r by the predetermined number of steps corresponds to the intermediate transmission ratio r.

Figure 7:
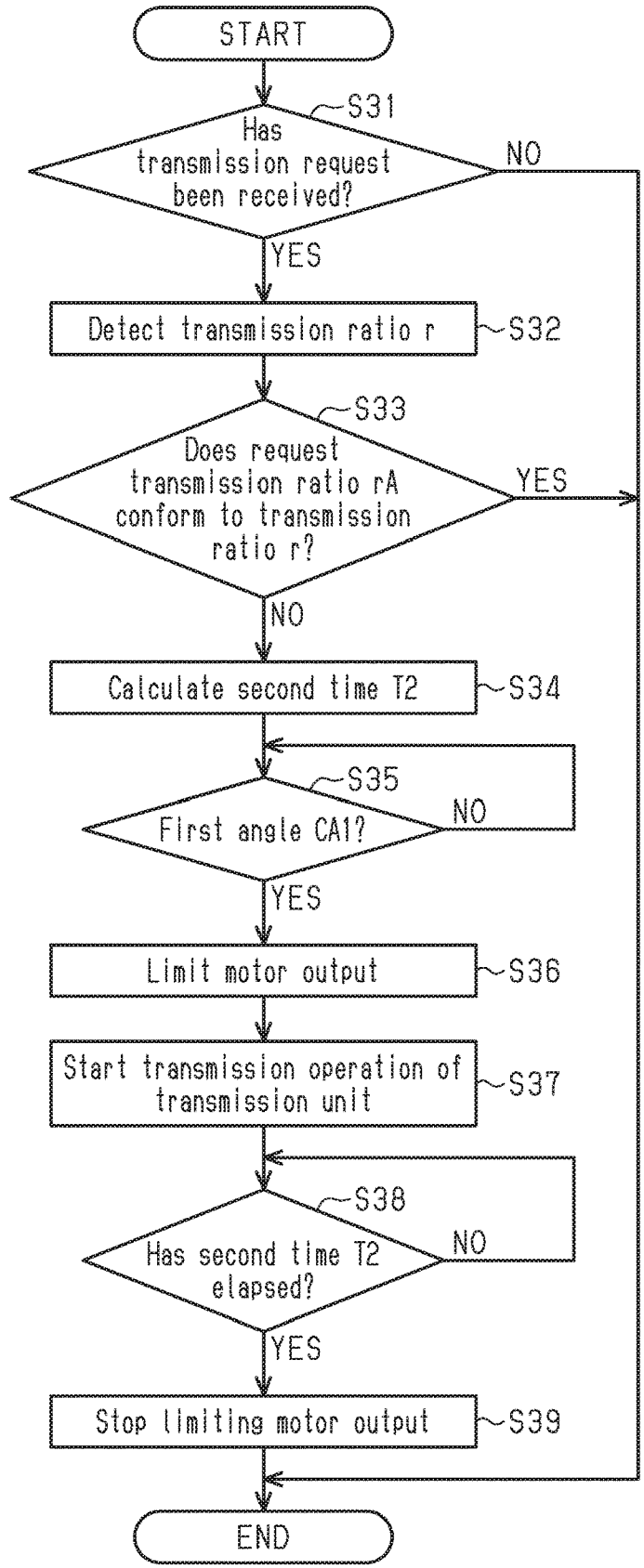
FIG. 7 is a flowchart of a third control executed by a second embodiment of an electronic control unit.

In the third control of the second embodiment shown in FIG. 7, only the transmission unit 22 can be controlled. Thus, the control of the motor 24 can be omitted. This modified example executes the processes that omit the processes of steps S36 and S39 from the third control. In this modified example, the third control can be performed on the bicycle control system 20 that does not include the motor 24.

Figure 8:
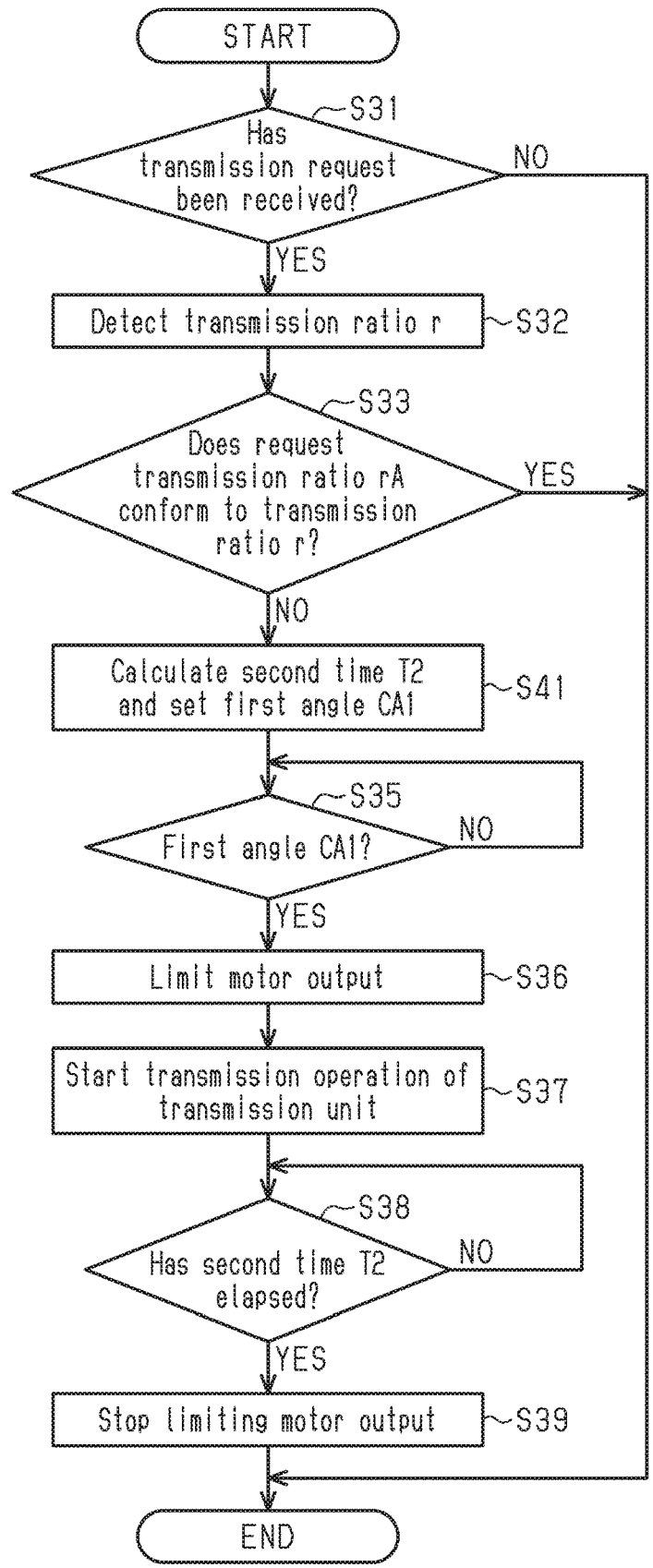
FIG. 8 is a flowchart of a fourth control executed by a third embodiment of an electronic control unit.

In the fourth control of the third embodiment shown in FIG. 8, only the transmission unit 22 can be controlled. Thus, the control of the motor 24 can be omitted. This modified example executes the processes that omit the processes of steps S36 and S39 from the fourth control. The fourth control can be performed on the bicycle control system 20 that does not include the motor 24.

In the third control of the second embodiment and the fourth control of the third embodiment, the rotational angle CA of the crank that stops the limitation of the motor 24 can be set instead of setting the second time T2. More specifically, in step S34 of the second embodiment shown in FIG. 7 or step S41 of the third embodiment, the electronic control unit 42 sets the range of the rotational angle CA of the crank that limits the output of the motor 24. The electronic control unit 42 calculates the rotational angle CA of the crank that stops the limitation on the output of the motor 24 based on the second time T2. The range of the rotational angle CA of the crank that limits the output of the motor 24 is increased as the second time T2 becomes longer. Thus, as the second time T2 becomes longer, the rotational angle CA of the crank that stops the limitation on the output of the motor 24 is changed further to the downstream side in the first direction. In step S38, the electronic control unit 42 repeats the process of step S38 until the rotational angle CA of the crank reaches the angle that stops the limitation on the output of the motor 24.

In the first and second embodiments, the output signal of the operation unit 26 can include a request for changing the transmission ratio r in multiple steps. In this case, the operation unit 26 includes, for example, a switch that changes the transmission ratio r in multiple steps. Additionally, in a case in which the electronic control unit 42 receives an output signal of the operation unit 26, the electronic control unit 42 can set a shift request that changes the transmission ratio r in multiple steps in accordance with the content of the signal or the control state of the bicycle 10.

In step S35 of the third or fourth control of the second and third embodiments, if the electronic control unit 42 determines that the rotational angle CA of the crank has not reached the first prescribed angle CA1, then the electronic control unit 42 can end the process. After a predetermined cycle, the electronic control unit 42 can again perform the determination of step S31.

In the first and second embodiments, at least one of the limitation on the output of the motor 24 and the transmission operation can be started even in a case in which the rotational angle CA of the crank has not reached the first prescribed angle CA1. More specifically, the process of step S24 can be omitted from the first embodiment. Alternatively, the process of step S35 can be omitted from the second embodiment. In this case, for example, immediately after step S23 ends, step S25 can be executed. Alternatively, at the time that the torque detected by the torque sensor 34 becomes less than or equal to a predetermined value, step S25 can be executed. Further, in the second control of the first embodiment shown in FIG. 4, the process of step S64 can be omitted in addition to the process of step S24.

The control of the above embodiments can be performed in a second control, a third control, or a fourth control of an automatic transmission in which the electronic control unit 42 automatically controls the transmission unit 22 to perform transmission in accordance with one or more sensors installed to the bicycle 10. The one or more sensors installed to the bicycle 10 include at least one of a torque sensor, a vehicle speed sensor and a cadence sensor. The electronic control unit 42 determines whether or not the shift request is received based on signals from the one or more sensors installed to the bicycle 10 and an automatic transmission control program stored in the memory 44.

What is claimed is:

1. A bicycle controller comprising:
an electronic control unit that controls a transmission unit, which is configured to change transmission ratio of a bicycle in a stepped manner, and that controls a motor, which assists propulsion of the bicycle, in accordance with a shift request that changes the transmission ratio,
the electronic control unit being configured to selectively execute one of a first shifting operation and a second shifting operation in a case in which the transmission ratio is changed in multiple steps in accordance with the shift request,
in the first shifting operation, the electronic control unit being configured to limit output of the motor and operates the transmission unit to reach a requested transmission ratio that corresponds to the shift request, and
in the second shifting operation, the electronic control unit being configured to limit the output of the motor and operate the transmission unit to reach an intermediate transmission ratio of the requested transmission ratio, and after the electronic control unit temporarily reduces the limit on the output of the motor, the electronic control unit again limits the output of the motor and operates the transmission unit.

2. The bicycle controller according to claim 1, wherein the electronic control unit is further configured to limit the output of the motor and starts to operate the transmission unit upon the electronic control unit receiving the shift request and a rotational angle of a crank of the bicycle reaching a first prescribed angle.

3. The bicycle controller according to claim 2, wherein the first prescribed angle is included in a range of 45 degrees from a first rotational angle corresponding to one of a top dead center and a bottom dead center of one of crank arms of the crank to an upstream side of the first rotational angle in a first direction in which the crank is rotated to propel the bicycle.

4. The bicycle controller according to claim 1, wherein in the second shifting operation, after the electronic control unit temporarily reduces the limit on the output of the motor, the electronic control unit is further configured to limit the output of the motor and starts to operate the transmission unit upon detecting a rotational angle of a crank of the bicycle reaching a prescribed angle.

5. The bicycle controller according to claim 4, wherein the prescribed angle is included in a range of 45 degrees from a second rotational angle corresponding to the other one of a top dead center and a bottom dead center of one of crank arms of the crank to an upstream side of the second rotational angle in a first direction.

6. The bicycle controller according to claim 2, wherein in the second shifting operation, after the electronic control unit temporarily reduces the limitation on the output of the motor, the electronic control unit is further configured to limit the output of the motor and starts to operate the transmission unit upon detecting the rotational angle of the crank of the bicycle reaching a second prescribed angle, and
the second prescribed angle is equal to the first prescribed angle.

7. The bicycle controller according to claim 2, wherein the electronic control unit is further configured to selectively execute one of the first shifting operation and the second shifting operation in accordance with the shift request that is received before the rotational angle of the crank reaches the first prescribed angle.

8. The bicycle controller according to claim 2, wherein the electronic control unit is further configured to limit the output of the motor until a first time elapses from a time that the rotational angle of the crank reaches the first prescribed angle.

9. The bicycle controller according to claim 2, wherein the electronic control unit is further configured to limit the output of the motor from a time that the rotational angle of the crank reaches the first prescribed angle until the rotational angle of the crank reaches a second prescribed angle.

10. The bicycle controller according to claim 1, wherein the electronic control unit is further configured to execute one of the first shifting operation and the second shifting operation in accordance with at least one of the number of steps in the transmission ratio to reach the requested transmission ratio and a shifting time that is required to move the transmission unit to the requested transmission ratio.

11. The bicycle controller according to claim 8, wherein the electronic control unit is further configured to execute one of the first shifting operation and the second shifting operation in accordance with a second time that is required to move the transmission unit to the requested transmission ratio,
in a case in which the first time is greater than or equal to the second time, the electronic control unit is further configured to execute the first shifting operation, and
in a case in which the first time is less than the second time, the electronic control unit is further configured to execute the second shifting operation.

12. The bicycle controller according to claim 9, wherein the electronic control unit is further configured to execute one of the first shifting operation and the second shifting operation in accordance with a shifting time that is required to move the transmission unit to the requested transmission ratio,
in a case in which an estimated time from a beginning time that the rotational angle of the crank reaches the first prescribed angle to an ending time that the rotational angle of the crank reaches the third prescribed angle is greater than or equal to the shifting time, the electronic control unit is further configured to execute the first shifting operation, and
in a case in which the estimated time is less than the shifting time, the electronic control unit is further configured to execute the second shifting operation.

13. A bicycle controller comprising:
an electronic control unit that operates a transmission unit, which is configured to change transmission ratio of a bicycle in a stepped manner, in accordance with a shift request that changes the transmission ratio,
the electronic control unit being configured to selectively execute one of a first shifting operation and a second shifting operation in a case in which the transmission ratio is changed in multiple steps in accordance with the shift request,
in the first shifting operation, the electronic control unit being configured to start to operate the transmission unit upon detecting a rotational angle of a crank of the bicycle reaching a first prescribed angle and operate the transmission unit until reaching a requested transmission ratio that corresponds to the shift request, and
in the second shifting operation, the electronic control unit being configured to start to operate the transmission unit upon detecting the rotational angle of the crank of the bicycle reaching the first prescribed angle and operate the transmission unit until reaching an intermediate transmission ratio of the requested transmission ratio, and then upon the rotational angle of the crank reaching a second prescribed angle, the electronic control unit being configured to resume operation of the transmission unit to change from the intermediate transmission ratio to the requested transmission ratio.

14. The bicycle controller according to claim 13, wherein the first prescribed angle is included in a range of 45 degrees from a first rotational angle corresponding to one of a top dead center and a bottom dead center of one of crank arms of the crank to an upstream side of the first rotational angle in a direction in which the crank is rotated to propel the bicycle.

15. The bicycle controller according to claim 14, wherein the second prescribed angle is included in a range of 45 degrees from a second rotational angle corresponding to the other one of the top dead center and the bottom dead center of the one of the crank arms to an upstream side of the second rotational angle in the first direction, or
the second prescribed angle is equal to the first prescribed angle.

16. The bicycle controller according to claim 14, wherein the electronic control unit is further configured to execute one of the first shifting operation and the second shifting operation in accordance with at least one of the number of steps in the requested transmission ratio and a shifting time that is required to move the transmission unit to the requested transmission ratio.

17. The bicycle controller according to claim 16, wherein the electronic control unit is further configured to execute the first shifting operation in a case in which a predetermined first time is greater than or equal to the shifting time, and
the electronic control unit is further configured to execute the second shifting operation in a case in which the predetermined first time is less than the shifting time.

18. The bicycle controller according to claim 1, wherein the electronic control unit is further configured to receive an output signal from an operation unit, which is operable by a rider, as the shift request.

19. The bicycle controller according to claim 18, wherein the electronic control unit is further configured to selectively execute one of the first shifting operation and the second shifting operation upon detecting the operation unit being continuously operated for a predetermined first period or the operation unit being operated multiple times within a second predetermined period.

20. A bicycle control system comprising:
the bicycle controller according to claim 18;
the transmission unit;
the motor; and
the operation unit.

21. A bicycle controller comprising:
an electronic control unit that controls a transmission unit, which is configured to change transmission ratio of a bicycle in a stepped manner, and that controls a motor, which assists propulsion of the bicycle, in accordance with a shift request that changes the transmission ratio, upon the electronic control unit receiving the shift request, and a crank of the bicycle reaching a first prescribed angle, which is located at an upstream side of a rotational angle that corresponds to a top dead center or a bottom dead center in a first direction in which the crank is rotated to propel the bicycle, the electronic control unit being configured to limit output of the motor and start to operate the transmission unit, and the electronic control unit being configured to change the first prescribed angle further to the upstream side in the first direction in a case in which the transmission unit changes the transmission ratio in multiple steps in accordance with the shift request from a case in which the transmission unit changes the transmission ratio in only one step.

\* \* \* \* \*